United States Patent [19]

P. Deborah Clark

[11] Patent Number: 5,311,423
[45] Date of Patent: May 10, 1994

[54] SCHEDULE MANAGEMENT METHOD

[75] Inventor: P. Deborah Clark, Anaheim, Calif.

[73] Assignee: GTE Service Corporation, Stamford, Conn.

[21] Appl. No.: 637,854

[22] Filed: Jan. 7, 1991

[51] Int. Cl.$^5$ .................. G06F 15/22; G06F 15/24; G06G 7/52

[52] U.S. Cl. .................. 364/401; 455/3.1; 348/6; 348/906

[58] Field of Search .............. 358/83; 364/401, 403; 455/3.1

[56] References Cited

U.S. PATENT DOCUMENTS

| | | | |
|---|---|---|---|
| 4,176,260 | 11/1979 | Ward et al. | 235/475 |
| 4,538,174 | 8/1985 | Gargini et al. | 358/86 |
| 4,700,386 | 10/1987 | Kohn | 380/10 |
| 4,890,320 | 12/1989 | Monslow et al. | 380/10 |
| 4,947,244 | 8/1990 | Fenwick et al. | 358/86 |
| 5,007,518 | 4/1991 | Crooks et al. | 194/212 |
| 5,124,912 | 6/1992 | Hotaling et al. | 364/401 |
| 5,168,353 | 12/1992 | Walker et al. | 358/86 |

FOREIGN PATENT DOCUMENTS

| | | |
|---|---|---|
| 0493098 | 1/1992 | European Pat. Off. . |
| 0493099 | 1/1992 | European Pat. Off. . |

Primary Examiner—Roy N. Envall, Jr.
Assistant Examiner—Laura Brutman
Attorney, Agent, or Firm—John A. Odozynski; Brian M. Sakima

[57] ABSTRACT

A method of managing information used and generated in the scheduling and exhibition of performances is disclosed. A video network includes a video server that operates several video recorders to simultaneously exhibit video performances or programs on a plurality of channels. The video server is controlled in real time in accordance with data presented to it in an exhibition plan. The exhibition plan is generated through the performance of an exhibition manager process which operates on a computer. The exhibition manager manages information related to the performances to be exhibited, schedules the performances in accordance with user-supplied timing data, prints reports, and maintains a personal information manager having a database describing studios, contacts, and other information related to licensing the performances for exhibition on the network. The information related to performances includes repeat factors and short titles which the exhibition manager calculates. The scheduling activities of the exhibition manager automatically schedule repeated exhibitions of a performance in accordance with the performance's repeat factor. An inventory manager takes the exhibition manager's schedule and automatically expands it to schedule individual media copies of performances. The inventory manager automatically prints purchase orders and tracks media copies after they are received. Unique codes are affixed to the media copies and to the places where the media copies might possibly reside. Portable scanners are used to associate an employee id, a media copy code, a location code, and a date and time stamp together to track inventory and to provide accountability for the media copies.

21 Claims, 17 Drawing Sheets

SCHEDULE MANAGEMENT METHOD

RELATED APPLICATIONS

The present invention is related to:
1. "Inventory Management Method," by P. Deborah Clark, Ser. No. 07/637,857 filed on the same day as the present application and assigned to the assignee of the present invention.
2. "Method For Providing Video Programming Nearly On Demand," by Kathryn E. Ullrich, et al., Ser. No. 07/633,637, filed on Dec. 21, 1990, and assigned to the assignee of the present invention.
3. "Video Distribution System Allowing Viewer Access to Time Staggered Identical Prerecorded Programs," by Stephen S. Walker, et al., Ser. No. 07/633,593, filed on Dec. 21, 1990, now U.S. Pat. No. 5,168,353.

TECHNICAL FIELD OF THE INVENTION

The present invention relates generally to the scheduling of performances and the subsequent public exhibitions of the scheduled performances. More specifically, the present invention relates to methods for efficiently and accurately managing the scheduling of programs, the acquisition of media copies of programs, the management of an inventory of the media copies, and the exhibitions of the programs throughout a predetermined period of time.

BACKGROUND OF THE INVENTION

Video and audio broadcasters engage in performing or otherwise broadcasting audio and visual productions or programs. Typically, such performances are provided to the broadcasters on magnetic and optical recording media, such as video and audio disks and tapes, over satellite or network feeds, from live performances, and the like. The broadcasters rebroadcast these performances over their networks. Each broadcast may be considered an exhibition of the performance. Often, the broadcasters simultaneously exhibit numerous performances on multiple channels, and many of the performances may be repeated at various times.

Due to competitive and other factors, many broadcasters are forced to reduce their overhead costs to a minimum. As a result, a modern network may be essentially controlled by only a single person who operates a wide assortment of automated equipment. However, in all but the most simple networks, the management of information related to scheduling performance exhibitions, the acquisition of sufficient media copies to meet the schedule, and the control of equipment in accordance with the schedule place strenuous demands on the person or persons who operate the network.

For example, the performances must be sought out and licensed. Different performances are licensed under different terms. The performances may be available only in accordance with various timing requirements, and licensing terms typically require fees which are based upon the number of exhibitions each performance experiences over the network. Likewise, the performances may originate from numerous different sources and different performances run for different lengths of time. Scheduling demands require promotional, advertising, public service, and other timing considerations to be juggled with the run times of the licensed performances. Moreover, scheduling must often be accurately prepared in advance so that exhibition plans or listings may be printed and distributed to network subscribers in advance of the scheduled exhibitions.

Once a schedule that favorably balances all these factors has been compiled, steps must be taken to insure that the schedule is realized. In other words, the schedule, which consists of abstract information, is converted into real world products and processes. For example, steps are taken to make the media upon which the performances are recorded available. These media needs to be available at the proper time and in a needed quantity. The media must contain the proper performances and must work properly. Moreover, the media copies must be managed so that they are readily available when needed and not mixed up or otherwise confused with other media copies. Contingencies for other real world problems, such as jammed or missing media copies, must also be considered. A modern network must continue to operate in accordance with published schedules in spite of numerous "real world" problems which might work against meeting the schedule.

SUMMARY OF THE INVENTION

Accordingly, it is an advantage of the present invention that a method for efficiently and accurately managing exhibitions of performances is provided.

Another advantage of the present invention is that a method is provided that adapts one or more computers to manage the exhibition of performances so that only a few persons are needed to control a network.

Yet another advantage is that the present invention provides a scheduler which is particularly adapted to the needs of pay-per-view (PPV) networks.

Another advantage is that the present invention accommodates repetition of exhibitions on a single channel.

Still another advantage is that the present invention accommodates simultaneous exhibitions on multiple channels.

Another advantage is that the present invention accommodates multiple or single exhibitions of multiple titles on a single channel.

Yet another advantage is that the present invention manages the acquisition and inventory of media copies of performances scheduled for exhibition.

Still another advantage is that the present invention automatically calculates needed quantities of media copies and dates at which media copies are needed.

Another advantage is that the present invention assigns unique media copy codes to received media copies and unique location codes to potential locations where the media copies might possibly reside to track and provide accountability for the received media copies.

The above and other advantages of the present invention are carried out in one form by a method of efficiently and accurately managing the exhibition of predetermined performances throughout an interval of time. The method calls for entering data describing the predetermined performances into a computer. The computer will then retain a unique data record for each performance. Timing data is also specified to the computer. The timing data describes when to exhibit one of the performances. The computer then repetitively associates the data record for one of the performances with timing data to produce an exhibition plan.

The above and other advantages of the present invention are carried out in another form by a method of managing exhibitions of predetermined performances that are recorded on recording media. The method calls for scheduling exhibitions of the performances to occur at predetermined times and on predetermined channels. The method then creates a master data structure which identifies, for each channel and each performance throughout a predetermined interval, specific media copies to be transmitted over specific channels at specific times. The method calculates, for each of the individual performances, the number of media copies that are needed to accommodate the schedule. A video server is controlled to play the specific media copies in accordance with the master data structure.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
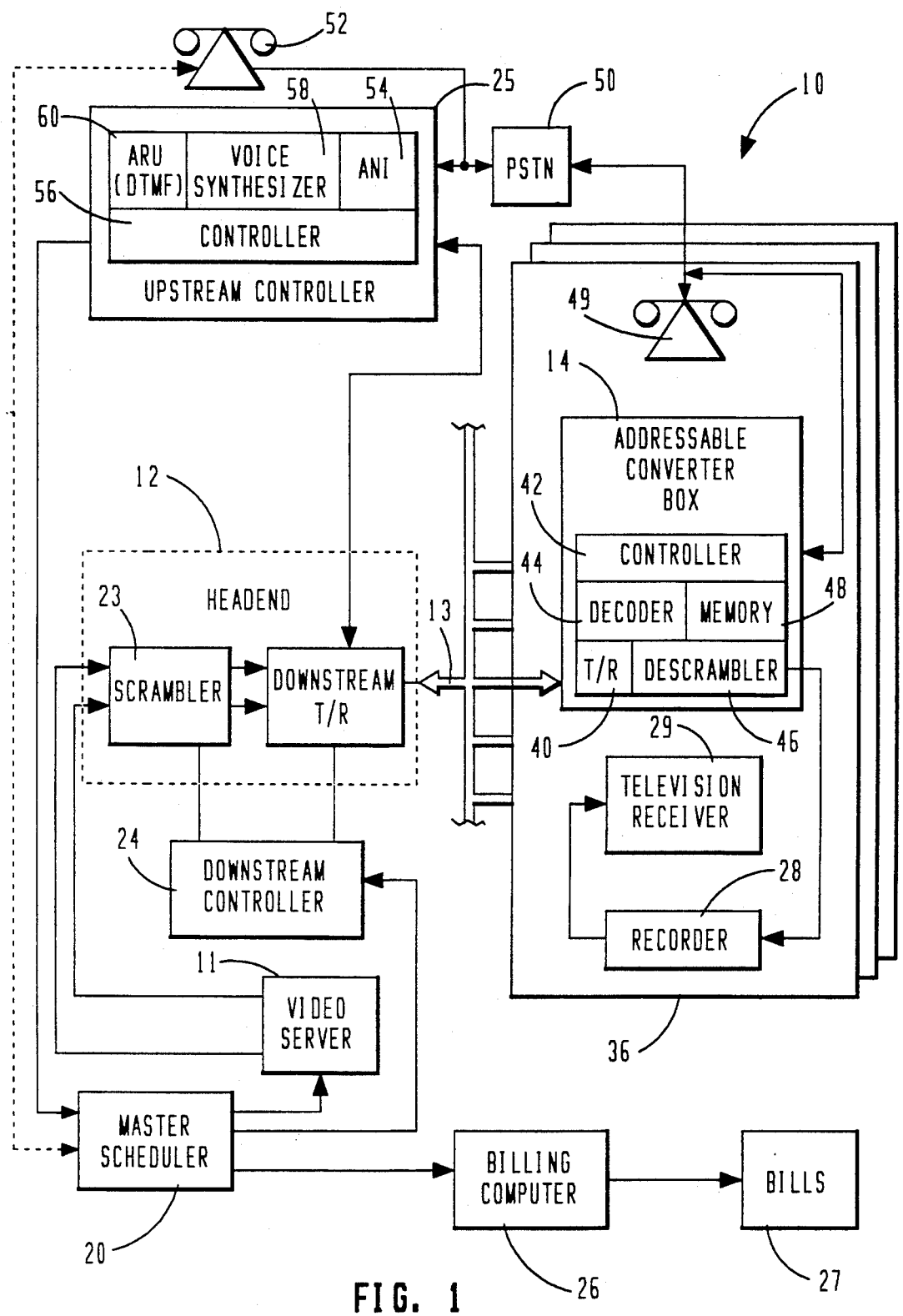
FIG. 1 shows a schematic representation of a system for distributing video programming, including a video server, in accordance with a preferred embodiment of the present invention.

Referring first to FIG. 1, there is seen a schematic representation of a system 10 for distributing video programming in accordance with a preferred embodiment of the present invention. System 10 includes a video server 11 interfaced to a headend 12 of a transmission system 13 having a plurality of channels. Transmission system 13 couples to a multiplicity of addressable converter boxes 14 located in respective subscriber premises 36.

Figure 2:
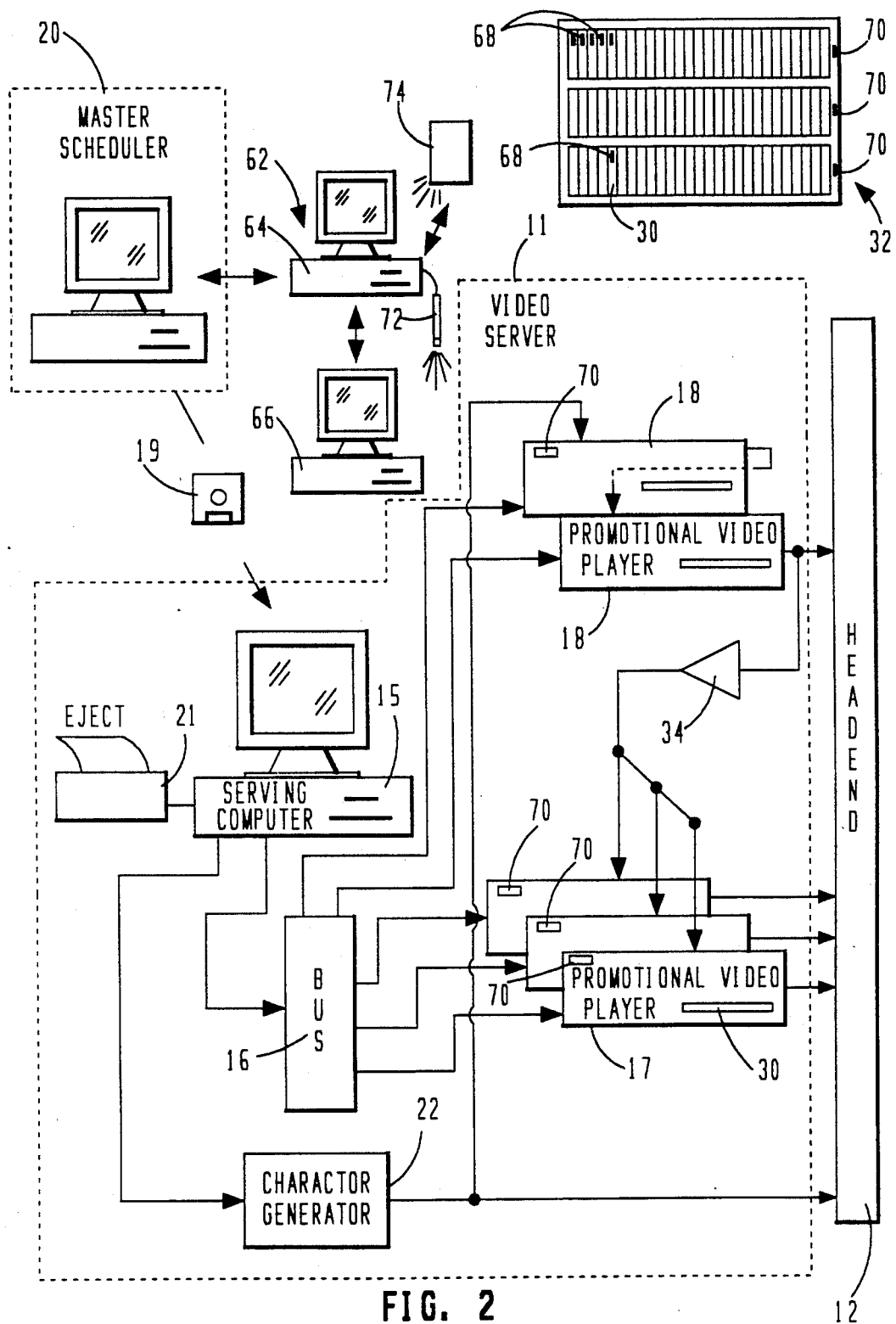
FIG. 2 shows a block diagram of a video server configured in accordance with the preferred embodiment of the present invention.

FIG. 2 is a block diagram of the video server 11 shown in FIG. 1. Video server 11 includes, among other elements, a serving computer 15 and software, a control bus 16, and a plurality of video or media players 17.

The serving computer 15 performs all control functions (e.g. start, stop, rewind, etc.) for the video players 17 in accordance with an exhibition plan or schedule (discussed below). Computer 15 also gathers video player usage data. The serving computer 15 is loaded with the exhibition plan, which specifies timing instructions. The serving computer 15 is programmed to provide real time outputs in response to these timing instructions. The exhibition plan may be entered by hand, provided to the serving computer 15 on magnetic memory 19, or transferred directly from a master scheduling computer 20. The exhibition plan includes a five-digit event code, a title, rating code, channel, starting times, dates, run time, and price for each exhibition of a performance.

The serving computer 15 also monitors the status of the video players 17 and operates promotional channel video players 18. Operations are controlled through a menu. An operator display provides video player status monitoring. A status screen indicates whether a video playback machine is playing, rewinding, waiting to start playing, not in use, setting-up, or has failed. Provision of an alarm during video player failure is included. Monitors (not shown) show what is on a selected channel.

A commercially available parallel bus 16 provides a communications path between an output port of serving computer 15 and video players 17 and 18, allowing the serving computer 15 to automatically operate the control features of the video players. Bus 16 includes one or more bus controller panels which provide control signals in response to the real time outputs of the computer 15. These in turn operate video player parallel decoders, each of which can control several video players.

Video players 17 are used for playing recorded media containing programs in television format or for coupling a line feed from a live program. The video players 17 may be any controllable player means such as videocassette recorders (VCRs) or disk players. Pre-recorded videocassette format is the most frequently used medium for video storage in the preferred embodiment of the present invention. Video cassette players may be software controlled for automatic rewind and playback of tapes. Optical disks are another storage medium. An attractive feature of optical disk players is the capability of multiple playing heads reading a disk. Of course, human intervention is needed to insure that a proper tape is inserted in a proper player 17 at a proper time. The management of instructions for such human intervention are discussed below.

Each video player has a control port coupled to the bus 16 and is responsive to the control signals. Each video player also has an output providing television signals for coupling to a separate corresponding channel via the headend 12 of the transmission system 13 (see FIG. 1).

The video players 17 play video selections starting at times specified by the exhibition plan. Each player can be set for different start times. At the start time, the medium is played at the start of the active program, which is not necessarily the beginning of the medium. At the end of the program the medium is automatically rewound, if necessary, and set to the program start.

In the preferred embodiment of the present invention, at least two of the video players 17 are loaded with duplicate recorded media and controlled to play at staggered or overlapping time intervals. This staggered timing of a single program on multiple channels allows subscribers to have access to desired video nearly on demand.

The medium is changed in the video server through human intervention in either of two circumstances. The first is when the exhibition plan dictates that a different program will start at a certain time and on a certain channel and that the existing video medium should be removed and a new medium inserted. Accordingly, an operator may replace a given tape 30 to a library 32 and select a different tape 30 from library 32 for insertion in players 17–18 in accordance with scheduling instructions (discussed below).

The second circumstance occurs due to degradation of the medium after being played a specified number of times. In the preferred embodiment, an Inventory Manager process 62 performed within a computer 64 processes a given schedule to determine when a given media copy of a program will have been played a predetermined number, preferably around 50, of times. This number is selected so that the chances of program degradation and mechanical tape problems are extremely small when the number of playings are kept below the predetermined number. This information is passed along to an operator to instruct the operator to replace a tape with fresh copy at the appropriate time.

During a pause, such as rewinding, the input from another source cuts through the video player and becomes the player output which is shown on the channel. This enables the viewer's channel to show another video source such as a promotional or text channel during times when the player is not showing a program. Arrangements for a promotional channel are described below.

The video players 17 have stereo audio capacity. Since it is desirable to operate audio through balanced pairs for common mode rejection, two audio outputs are connected to a pair of unbalance-to-balance buffer amplifiers. Each video player's output signal is coupled to a corresponding channel at headend 12.

Each video player 17 output is coupled to a corresponding channel on the transmission system 13. The video output of the video server is connected through scrambling means (see FIG. 1) in headend 12. Each signal is selectably scrambled at headend 12 before being placed on transmission system 13 (see FIG. 1).

Video server 11 provides a promotional channel. The promotional channel operates similarly to a program channel, except each promotional segment is shorter in length than a program and is played continuously on one of two promotional video players 18. The two players alternately play identical preview segments. As one is playing, the other is rewinding. The promotional channel appears to play continuously. The switch from one video player to the other is set at a regular interval which does not interfere with controller operations of the other channels.

The promotional channel continuously shows promotional programming such as program previews, event promotions, order instructions, and programming information. A short promotional segment may be repeated back-to-back on a recorded medium so that the medium does not have to be rewound as frequently. Information on the promotional channel is changed as required, e.g. monthly, according to the programming schedule. The promotional channel operations are software controlled by the serving computer 15.

A character generator 22 is coupled to the serving computer 15 for providing a menu in television format representing a programming schedule. The menu includes the specific times at which the beginnings of the video programs may be viewed. Serving computer 15 continuously synchronizes the menu information with the video servers. The output of the character generator 22 is coupled unscrambled through headend 12 to a channel designated for text.

The output of the character generator 22 is also connected to the input of the first promotional video player. The output of the first promotional video player is connected to the input of the second promotional video player. The output of the second promotional video player is connected to a channel designated for promotionals. If both promotional video players 18 are in a non-play condition, then the character generator 22 output is automatically connected to the promotional channel.

The promotional channel output signal also couples through a distribution amplifier 34 so that it may be fed to the plurality of program video players 17. When any channel is not supplied with video from its video player 17, the promotional channel is automatically exhibited.

With reference back to FIG. 1, the programs and promotions are distributed on separate channels of the transmission system 13. Transmission system 13 may be configured as broadcast, satellite, cable, or fiber. Headend 12 includes a scrambler 23 which selectably scrambles the channels. FIG. 1 shows all channels from video server 11 being routed through scrambler 23 for completeness. However, in the preferred embodiment, only program channels are actually scrambled. Moreover, the scrambling is switched off and on through control signals provided by a downstream controller 24. Controller 24 receives scheduling information from master scheduler 20 and controls scrambling in accordance with the scheduling information.

Addressable converter box 14, or simply converter 14, enables downstream access to a channel. In other words, converter 14 allows and controls the viewing of programming in its respective subscriber premises 36. Generally speaking, a preview or promotional period of programming is shown unscrambled prior to the showing of each program. Converter 14 passes this promotional material toward television receiver 29 without any attempt at unscrambling. Thus, the subscriber may view intelligible programming. This unscrambled transmission continues for a predetermined period of time, preferably past the beginning of the program. However, downstream controller 24 eventually scrambles the program and instructs all enabled converters 14 in a global transmission to all premises 36 to unscramble the program. For converters 14 which have been enabled, subscribers may continue to view intelligible programming. However, converters 14 which have not been enabled do not unscramble the received signals and therefore send only unintelligible programming toward television receiver 29.

Converter 14 includes a receiver or transmitter/receiver section 40 which converts the received signals to baseband. A controller portion 42 of converter 14 includes a decoder 44 which looks for data in the baseband signals that are addressed to the converter 14. Controller 42 also controls a descrambler 46 so that incoming signals are selectively unscrambled. Such data may be addressed globally, so that all converters 14 interpret data as being directed to them, or locally, so that only a specific single converter 14 interprets the corresponding data as being directed to it. When such data is detected, controller 42 examines the data to determine whether it represents credit data, instructions for unscrambling an incoming scrambled signal on a specified channel or channels, instructions for refraining from unscrambling an incoming unscrambled signal on a specified channel or channels, instructions for enabling a specific channel or channels so it or they may later be unscrambled, and the like.

The preferred ordering system is impulse pay-per-view. In other words, a subscriber may view a preview or beginning of a program and instantly, on impulse, order the program for viewing at his or her premises 36. The ordering process allows ordering from a choice of different programs which start at various times. The preferred ordering process is capable of processing orders, both requesting and canceling service, in advance or up until some time into the event.

The ordering process also allows authorization for receiving orders prior to service delivery. Two types of authorization may be provided for: 1) authorization based on credit limitation, or 2) authorization based on parental control. Accurate records, correlated by program, are kept by the converter 14 until transferred to system 10 for analysis. Records include data on customer identification, events ordered and canceled (program title, start date and time), time and day of order transaction, blockage in ordering or receiving service, and price of program.

Alternate embodiments for methods of ordering programming are contemplated. In a preferred embodiment, a subscriber accesses a keypad (not shown) on the subscriber's converter 14 to enter an order. A simple push of a button will successfully cause an order to be entered. The converter 14 records the fact that an order has been placed in a memory 48, and associates the time of day and the channel being viewed with this information. Converter 14 may also verify that credit and parental authorization permit the order. This order will enable converter 14 to unscramble the programming in response to a global unscramble signal received from system 10.

Preferably, downstream controller 24 of system 10 polls each set-top converter 14 daily. If converters 14 have collected billing data, controller 24 requests them to transfer this data to upstream controller 25 of system 10. Such billing data may be transmitted either through the public switched telephone network (PSTN) 50 or over transmission system 13.

Alternatively, a subscriber may access a telephone 49, and place a call to a predetermined number for system 10. Ordering and authorization data may be placed through the public switched telephone network (PSTN) 50 to system 10. This PSTN-directed data may be received at system 10 either by a customer service representative who operates a telephone 52 and transfers data to master scheduler 20, or by a substantially automated upstream controller 25. Controller 25 may include an automatic number indicator (ANI) 54 that automatically receives the telephone number of the calling party. Of course, PSTN 50 must automatically pass the telephone number, as is currently done in certain locations, to ANI 54 so that ANI 54 may receive it. This telephone number is used to identify the subscriber who is placing an order or transmitting authorization data.

A controller portion 56 of upstream controller 25 may control a voice synthesizer 58 to return voice prompts back to the subscriber. Preferably, these voice prompts instruct the subscriber to press various keys on the subscriber's telephone. For example, the voice prompts may request the subscriber to first enter a personal identification number (PIN) for security purposes. The voice prompts may request the subscriber to enter a channel number for the program that a subscriber wishes to view. An audio response unit (ARU) 60 couples to the phone line to detect dual tone multifrequency (DTMF) signals generated when the subscriber presses keys on the subscriber telephone 49 and reports the numbers to controller 56 for transmission to master scheduler 20.

When upstream controller 25 receives the billing data, it stores and formats the data for transfer to master scheduler 20. Scheduler 20 then passes the information on to billing computer 26. Billing computer 26 receives information for each transaction on the customer, the event code ordered, and any other necessary data to identify the event code with title, rating, channel, starting times as well as date, run time, and price. Billing computer 26 prints a bill 27 which includes the program title, date, time, and price.

The system is adapted for transferring television programs from video server 11, i.e. upstream transmitter, over the transmission system 13 to a downstream video recorder 28 and television receiver 29 coupled to the converter 14. The downstream control signals may be sent on cable, fiber, or telephone lines, but preferably the same media the television signals are sent on.

Figure 3:
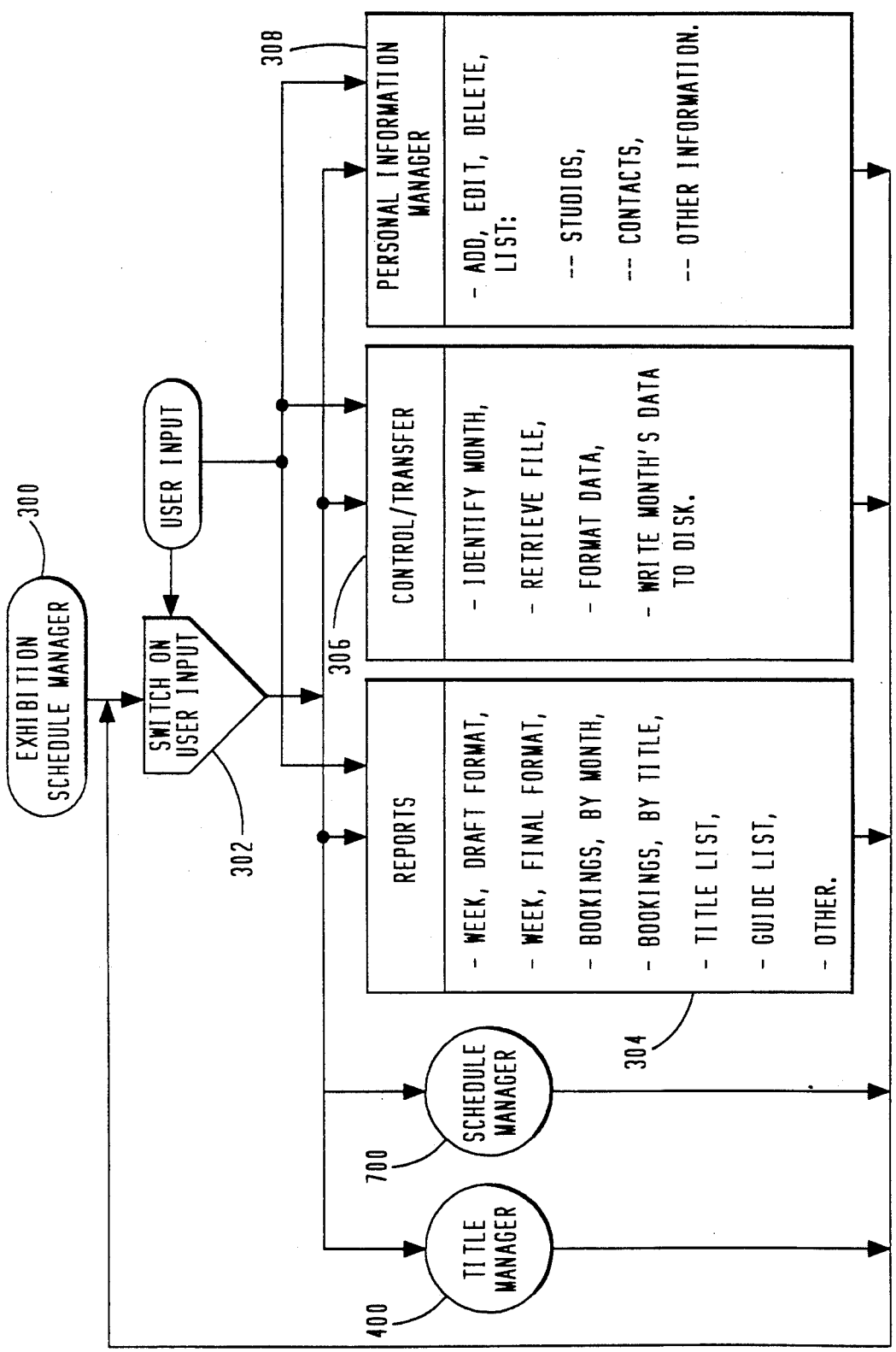
FIG. 3 shows a flow chart of an Exhibition Schedule Manager portion of the preferred embodiment of the present invention.

FIG. 3 shows a flow chart of an Exhibition Schedule Manager 300 portion of the preferred embodiment of the present invention. Exhibition Schedule Manager 300 is a process which is carried out in large part within a computer, such as computers 15, 20, 64, or preferably yet another computer 66 (see FIG. 2). The computer which performs exhibition schedule manager 300 preferably includes a video display, printer, disk or other permanent memory for long term data storage, and a keyboard or other device for transferring user input, i.e. data entered into the computer by a user of system 10 (see FIG. 1), or other user selections to the computer (not shown). All of these items are conventionally included with personal computers, and many different kinds and forms of commercially available personal computers may suffice for use in connection with the present invention. Exhibition Schedule Manager 300 is controlled through computer instructions stored within computer memory.

Upon starting Exhibition Schedule Manager 300, a switching task 302 receives user input to determine which of the several segments within Manager 300 to perform. Preferably, task 302 displays a menu which identifies the possible segments that are available for the user to select. By using the term "display", those skilled in the art will recognize that a video display terminal is controlled to visually indicate the specified information. "Display" is contrasted with the term "print" or "printed", which is used below to refer to the control of a printer or like device to make a hard copy of specified information. Once the user has selected a segment, task 302 switches program control to the selected segment.

Task 302 may, upon a user input selection, switch program control to a Title Manager segment 400. Title Manager 400 allows Exhibition Schedule Manager 300 to manage a "titles database" (not shown) that describes any number of performances potentially available for exhibition. Title Manager 400 is discussed below in connection with FIG. 4.

Task 302 may, upon a user input selection, switch program control to a Schedule Manager segment 700. Schedule Manager 700 allows Exhibition Schedule Manager 300 to manage a multiplicity of files which associate specified performances with specified timing criteria and channel identification data. These files serve as exhibition plans. Schedule Manager 700 is discussed below in connection with FIG. 7.

Task 302 may, upon a user input selection, switch program control to a reports segment 304. Reports segment 304 generally prints various reports connected with the scheduling of performance exhibitions. Specifically, in the preferred embodiment, segment 304 accesses one or more of the files managed by Title and Schedule Managers 400 and 700 and prints at least portions of the data contained therein. User input specifies which files to access and which type of report to print. For example, reports segment 304 may print a weekly exhibition plan. User input specifies the week to be printed and whether to print the report in a draft or final form. Reports segment 304 may print bookings of performances. User input specifies a month for which bookings are to be reported or a specific performance title for which bookings are to be reported. Likewise, segment 304 may print a list of available titles or an exhibition plan in a particular "guide" format, which network customers find convenient. Of course, those skilled in the art will recognize that segment 304 may be further configured to sort through the files managed by segments 400 and 700 and to print any other useful information contained therein.

Task 302 may, upon a user input selection, switch program control to a control/transfer segment 306. Control/transfer segment 306 generally causes the computer upon which Exhibition Schedule Manager 300 is being performed to generate execution plan data in a format which is useful for other components of system 10 (see FIG. 1). Specifically, during segment 306 user input identifies a month whose exhibition plan is to be transferred. Segment 306 retrieves a file containing the exhibition plan for the specified month. If necessary, the data in this file may be reformatted into a form that is compatible with the needs of components which will receive the information. In the preferred embodiment, this data is then transferred to a diskette. Of course, those skilled in the art will recognize that the data may alternatively be transferred to computer 64 via a local area network, the PSTN, or other data communication channels.

As shown in FIG. 2, this diskette may be transferred to another computer, such as computer 64, where it will be used as a basis for acquiring media copies of the scheduled performances, tracking inventory of received media copies, and generating control data for the control of video server 11. The Inventory Manager 62 which resides on computer 64 and performs these processes is discussed below in connection with FIGS. 10-17. As a result, performances are exhibited in accordance with the monthly exhibition plan in the manner discussed above in connection with FIGS. 1-2.

Task 302 may, upon a user input selection, switch program control to a personal information manager segment 308. Personal information managers are well known to those skilled in the art, and the techniques and processes used by segment 308 may be conventional ones. For example, segment 308 allows a user to manage information about people and organizations. This information may be added, edited, deleted, displayed and printed. In the preferred embodiment, this information identifies the studios from whom performances may be licensed and personal contacts for the studios. Segment 308 may advantageously permit addresses, phone numbers, and any other pertinent information to be associated with the people and organizations. Furthermore, segment 308 may advantageously cause the computer within which Exhibition Schedule Manager 300 is performed to automatically dial such phone numbers. The licensing and availability of performances is critically important to the scheduling of performances. Accordingly, segment 308 retains and manages this type of information for Exhibition Schedule Manager 300 so that it is organized and instantly available for the user to ease scheduling.

After completion of each of segments 400, 700, and 304-308, program control returns to task 302. The user may then control the computer to re-select the same or a different segment.

Figure 4:
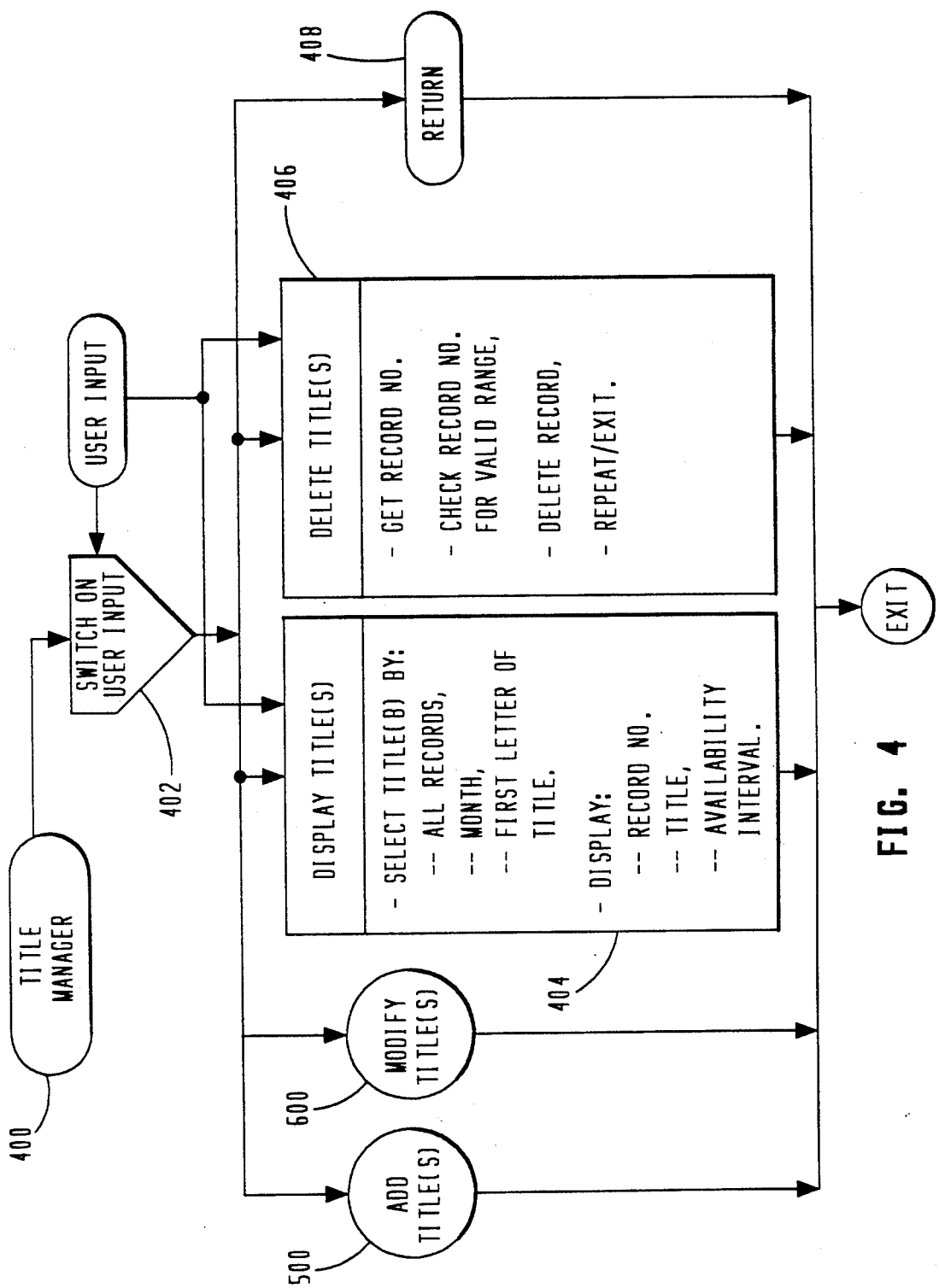
FIG. 4 shows a flow chart of a Title Manager segment of the Exhibition Schedule Manager of the preferred embodiment of the present invention.

FIG. 4 shows a flow chart of Title Manager segment 400. Title Manager 400 first performs a switching task 402, which switches program control to a selected procedure in accordance with user input. Preferably, task 402 displays a menu to inform the user of the possible procedures that may be selected.

Task 402 may, upon a user input selection, switch program control to an Add Title(s) procedure 500. Generally speaking, procedure 500 causes the computer to receive and generate data describing a new performance and to store this data in the titles database, discussed above. Add Title(s) procedure 500 is discussed below in connection with FIG. 5.

Task 402 may, upon a user input selection, switch program control to a Modify Title(s) procedure 600. Generally speaking, procedure 600 causes the computer to modify or edit data already existing in the titles database. Modify Title(s) procedure 600 is discussed below in connection with FIG. 6.

Task 402 may, upon a user input selection, switch program control to a Display Title(s) procedure 404. Generally speaking, procedure 404 accesses the titles database, filters the data included therein to identify only specified data records, and displays certain information included in the specified data records. Specifically, procedure 404 allows the user to specify the filtering parameters to select all records in the titles database, all records which are listed as being available for a specified month, or all records in which the first letter of the performance's title begins with a specified letter of the alphabet. Of course, those skilled in the art will recognize that other filter parameters may be configured to meet the needs of other scheduling applications. Once the filter parameters have been specified, procedure 404 processes the file or files which contain the titles database to identify the records specified by the filter parameters. When these records are identified, a portion of the data in the records is displayed. In the preferred embodiment, procedure 404 displays the record's unique identifying number, the title of the performance described by data record, and availability dates for the performance.

Task 402 may, upon a user input selection, switch program control to a Delete Title(s) procedure 406. Procedure 406 generally allows a user to specify a record within the titles database, then erase that record. For example, procedure 406 may advantageously display a query to the user that prompts the user to supply a record number. When the record number is received, procedure 406 may verify that the number is a legitimate record number. If the record number is not legitimate, procedure 406 may repeat the above-discussed query. When the record number is verified, procedure 406 deletes the record. After deleting the record, procedure 406 may advantageously display a query to the user that prompts the user to repeat the deleting process for another record or to exit procedure 406.

Task 402 may, upon a user input selection, switch program control through a return or exit sequence 408. Title Manager segment 400 also performs a return or exit sequence upon the completion of each of procedures 500, 600, 404, and 406. This return sequence causes program control to return to task 302, discussed above in connection with FIG. 3.

Figure 5:
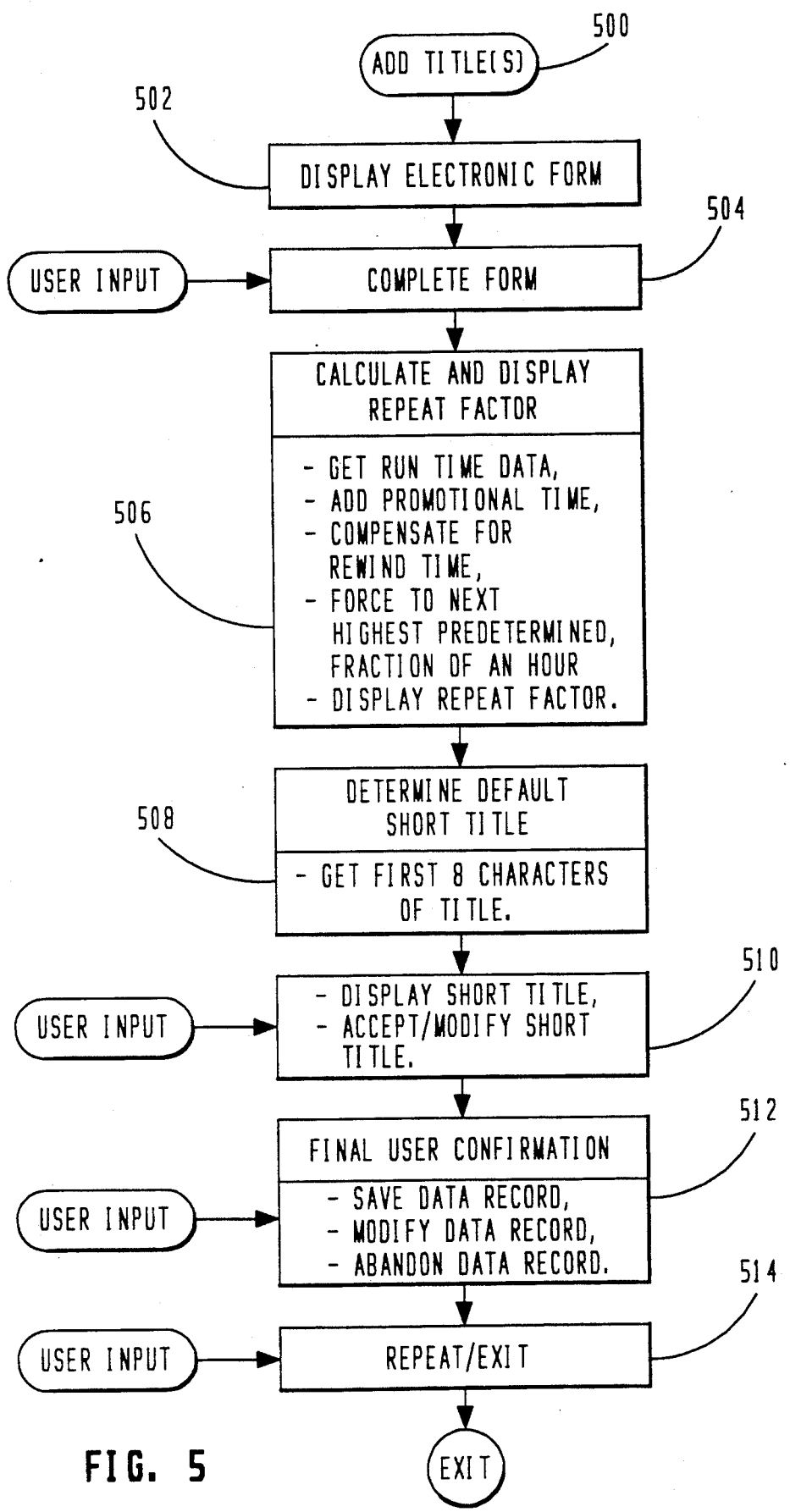
FIG. 5 shows a flow chart of an Add Title procedure performed by the Title Manager segment of the preferred embodiment of the present invention.

FIG. 5 shows a flow chart of Add Title(s) procedure 500. As discussed above, procedure 500 generally causes the computer to receive and generate data describing a new performance and to store this data in the titles database, discussed above. Specifically, procedure 500 performs a task 502 to display an electronic form. This electronic form identifies specific items that are needed to complete a data record which describes a single performance. The precise formatting of this electronic form on a video display is not important for the purposes of the present invention. TABLE I, presented below, lists various data elements identified by the electronic form of the preferred embodiment and included in a data record. Of course, those skilled in the art will recognize that the preferred embodiment is specifically adapted for exhibiting movies in a pay-per-view network. Other exhibition scheduling applications may advantageously require alternate data elements.

TABLE I

| Data Element | Description |
| --- | --- |
| Title | The performance's listed title. |
| Studio | The organization from which the performance is licensed. |
| Available From | The first day that the performance will be available for exhibition. |
| Available To | The last date that the performance will be available for exhibition. |
| Dup. Lab. | The name of the duplication laboratory that is licensed by the Studio to make copies of the performance from a master. |
| Rating | The performance's subject matter rating code. |

TABLE I-continued

| Data Element | Description |
| --- | --- |
| Category | A simple description of the performance's subject matter (i.e. drama, comedy, musical, documentary, etc.). |
| Run Time | The precise number of minutes from the beginning of the performance to the end of the performance without interruptions. |
| Deal No. | An identification of the agreement under which the performance is licensed. |
| —other— | Pricing information, comments, abstracts, and the like. |

After task 502 displays an electronic form, a task 504 receives user input which completes at least a portion of the form. After task 504, a task 506 automatically calculates and displays a repeat factor based upon the run time entered in task 504. The repeat factor is an additional data element included in each data record of the titles database. The repeat factor defines the time to be accorded to back-to-back exhibitions of a single performance operating on a single video player 17 (see FIG. 2). The repeat factor represents a period of time which is greater than the run time. Specifically, the repeat factor represents the run time increased to account for rewinding a tape, queuing the tape, airing promotional programming, and the like. The rewinding time is preferably based on the run time and the equipment capabilities of video players 17. The queuing time is based on the equipment capabilities, and the other factors are substantially arbitrary in accordance with procedures established for the operation of system 10 (see FIG. 1).

In addition, task 506 further increases the repeat factor so that it will exhibit a value taken from a plurality of discrete values. Operating procedures for system 10 dictate that performances start only on predetermined fractions of an hour, such as on ½ or ¼ hour boundaries. For example, when the predetermined fractions represent ½ hours, the plurality of discrete values take on the values 0.5, 1.0, 1.5, 2.0, 2.5, 3.0 hours, and so on. When task 506 has finally calculated the repeat factor, it is displayed for the user's information. As discussed below, the user has the option of increasing this repeat factor to satisfy specific scheduling situations.

After task 506, a task 508 automatically calculates a default short title. Often, a performance's full listed title is a long one that is cumbersome to work with. Task 508 determines an abbreviated alternate title which is easier to work with. In the preferred embodiment, task 508 selects the first eight characters from the performance's full listed title entered during task 504.

After task 508, a task 510 displays this short title so that the user may either accept this title or modify it. A majority of the time the automatically calculated short title will provide a unique identification of the performance being described while still providing sufficient information so that the user can comprehend the performance. However, when the user believes that the automatically calculated short title is not sufficiently unique or descriptive, task 510 permits the user to substitute an alternate short title.

Next, a task 512 performs a final user confirmation of the data record. Task 512 allows the user to specify whether to accept, modify, or abandon the data entered in task 504 and calculated during tasks 506–510. When the user elects to modify the data, program control returns (not shown) to task 502. When the user elects to abandon the data, program control exits (not shown)

procedure 500. When the user elects to save the data, the data record is written to the titles database. This data record includes the information entered during task 504 in addition to the repeat factor calculated in task 506 and the short title determined in tasks 508-510. After saving the data record, a task 514 allows the user to choose to repeat procedure 500 to describe another performance or to exit procedure 500. Upon exiting procedure 500, program control proceeds to task 302 (see FIGS. 3-4).

Figure 6:
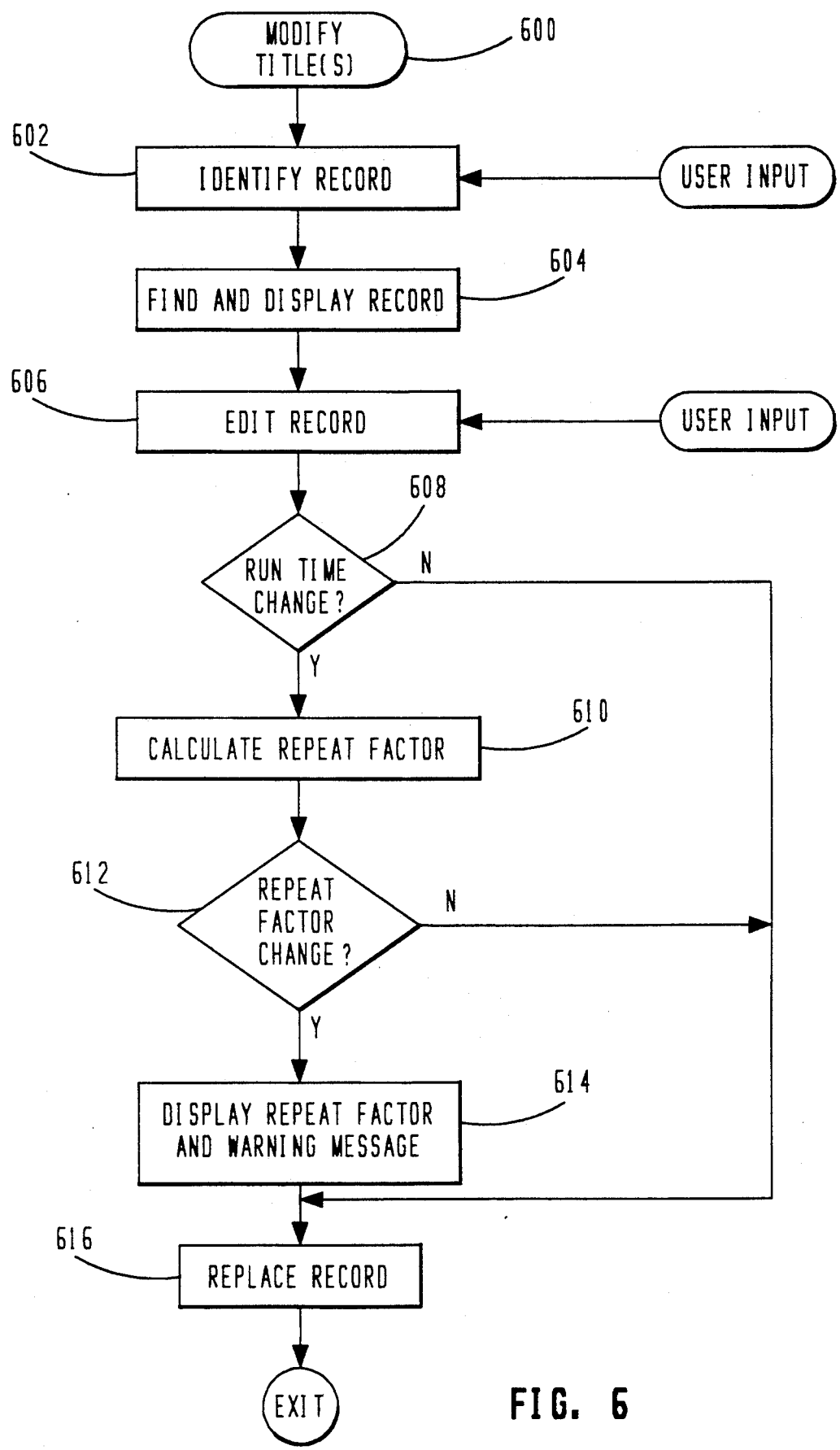
FIG. 6 shows a flow chart of a Modify Title procedure performed by the Title Manager segment of the preferred embodiment of the present invention.

FIG. 6 shows a flow chart of Modify Title(s) procedure 600. As discussed above, procedure 600 causes the computer to modify or edit data already existing in the titles database. A task 602 allows a user input to specify a particular data record to modify. A user may specify a title to identify a record. Next, a task 604 identifies and displays the selected record. When the desired record has been selected, a task 606 uses conventional editing techniques to edit the record in accordance with user input. Upon completion of the editing task, an inquiry task 608 examines the run time data element of the data record. If this element has changed due to the performance of editing task 606, a task 610 calculates a new repeat factor. Task 610 uses substantially the process discussed above in connection with task 506 (see FIG. 5). After task 610, another inquiry task 612 determines whether this newly calculated repeat factor has changed from its previous value. If the repeat factor has changed, a task 614 displays a warning message that instructs the user to warning message may state, " REPEAT FACTOR CHANGED —NEW REPEAT FACTOR IS_—MODIFY WEEKLY SCHEDULES." The message may also blink and beep to draw attention to it. The user may then determine which schedules require changing by running reports segment 304 (see FIG. 3) and may edit those schedules, as discussed below.

If task 608 determines that the run time has not changed, or if task 612 determines that the repeat factor has not changed, procedure 600 omits task 614. When task 608 determines that the run time has not changed, when task 612 determines that the repeat factor has not changed, or after task 614, program control proceeds to a task 616. Task 616 replaces the performance's data record in the titles database. After task 616, program control exits procedure 600 and returns to task 302 (see FIGS. 3-4).

Figure 7:
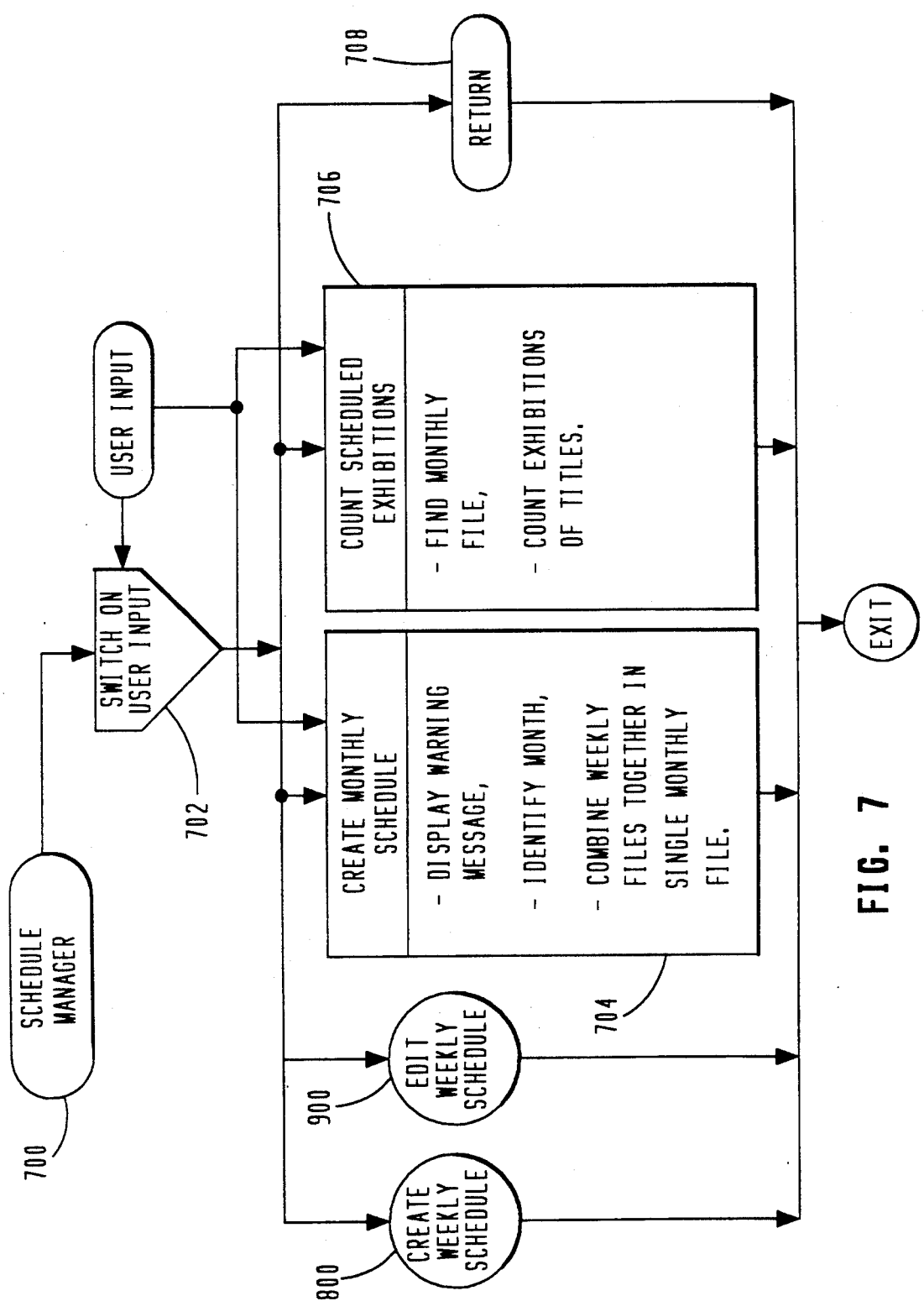
FIG. 7 shows a flow chart of a Schedule Manager segment of the Exhibition Schedule Manager of the preferred embodiment of the present invention.

FIG. 7 shows a flow chart of Schedule Manager segment 700, discussed above in connection with FIG. 3. Schedule Manager segment 700 first performs a switching task 702, which switches program control to a selected procedure in accordance with user input. Preferably, task 702 displays a menu to inform the user of the possible procedures that may be selected.

Task 702 may, upon a user input selection, switch program control to a Create Weekly Schedule procedure 800. Generally speaking, procedure 800 associates performance data from the titles database with timing data entered by the user to create an exhibition plan for a specified week. Create Weekly Schedule procedure 800 is discussed below in connection with FIG. 8.

Task 702 may, upon a user input selection, switch program control to an Edit Weekly Schedule procedure 900. Generally speaking, procedure 900 causes the computer to modify or edit an existing exhibition plan for a specified week. Edit Weekly Schedule procedure 900 is discussed below in connection with FIG. 9.

Task 702 may, upon a user input selection, switch program control to a Create Monthly Schedule procedure 704. Generally speaking, procedure 704 combines weekly exhibition plans together into a monthly exhibition plan. The division between weekly and monthly exhibition plans is provided primarily for the convenience of the scheduler. Those skilled in the art will realize that a scheduler could also schedule an entire month at a setting if desired.

Procedure 704 displays a warning message that informs the user that the weekly schedules must be completed before proceeding further with procedure 704. If the user wishes to continue, user input identifies the month for which an exhibition plan is to be created. When the month has been identified, procedure 704 automatically uses the month identifier to construct weekly names that correspond to the weeks of the specified month. These weekly names are used to name individual files that contain exhibition plans for the weeks of the specified month. If any of the weekly named files do not exist, procedure 704 is abandoned without further activity. When all weekly named files exist, procedure 704 extracts the information from those exhibition plans and combines it into a monthly plan.

Task 702 may, upon a user input selection, switch program control to a Count Scheduled Exhibitions procedure 706. Generally speaking, procedure 706 counts the scheduled exhibitions within a given month. This count is useful in determining licensing fees to be paid and in determining the number of copies of tapes 30 (see FIG. 2) which may be needed to replace worn out copies. In addition, licensing arrangements and other factors may suggest to the user that rescheduling should be performed when counts of some titles are at undesirable levels.

Procedure 706 receives user input which identifies a month to analyze. When the monthly exhibition plan for the specified month exists, the file is accessed and procedure 706 determines the count for each performance scheduled in the month.

Task 702 may, upon a user input selection, switch program control through a return or exit sequence 708. Schedule Manager segment 700 also performs a return or exit sequence upon the completion of each of procedures 800, 900, 704, and 706. This return sequence causes program control to return to task 302, discussed above in connection with FIG. 3.

Figure 8:
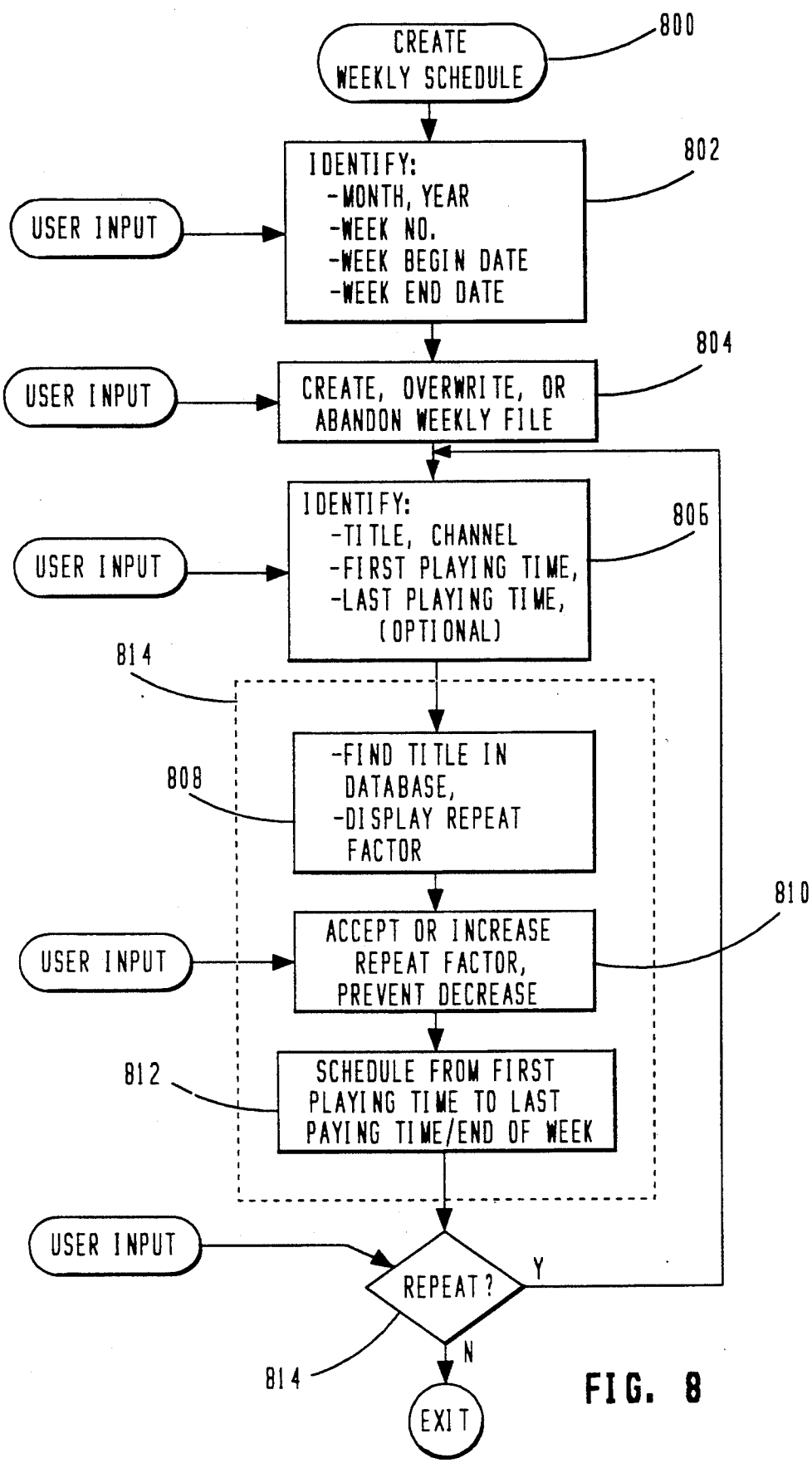
FIG. 8 shows a flow chart of a Create Weekly Schedule procedure performed by the Schedule Manager segment of the preferred embodiment of the present invention.

FIG. 8 shows a flow chart of Create Weekly Schedule procedure 800. As discussed above, procedure 800 generally associates performance data from the titles database with timing data entered by the user to create an exhibition plan for a specified week. In a task 802, procedure 800 receives user input that identifies timing of a week to be scheduled. Specifically, a user supplies information that ˙ lentifies the year, month, and beginning and ending dates of the week to be scheduled.

After task 802, if an exhibition plan file for the specified week does not already exist, a task 804 creates a file with a name that is constructed to uniquely identify the specified week. For example, the file name may include the first three characters of the month's name to identify the month, one digit (1-5) to identify the week of the month, and the last two digits of the year together with a predetermined extension, such as "DBF", to identify the file name as belonging to a weekly exhibition plan. If the specified week's exhibition plan file already exists, user input instructs task 804 whether to abandon procedure 800 or to overwrite the existing file.

After task 804, a task 806 receives user input that identifies the performance and desired timing for the performance. Specifically, task 806 receives the title for the performance, a channel upon which the performance is to be exhibited, and data identifying a first point in time at which the performance is to be exhibited. This first playing time represents the beginning of the performance. Task 806 may optionally receive data identifying a last playing time, which identifies the beginning of the last exhibition of the performance to be scheduled. If the last playing time is not specified, then performances are scheduled to continuously repeat throughout the day, and the daily schedule is repeated throughout the week. Accordingly, task 806 is used to specify an interval of time for which performances are to be scheduled.

After task 806, a task 808 accesses the titles database and locates the data record of the performance specified above in task 806. The performance's repeat factor/override repeat factor are displayed to inform the user that the performance has been located in the database. If any problem is encountered in utilizing the specified performance in the weekly schedule, program control may return (not shown) to task 806 to receive user input that specifies another title.

When an acceptable data record has been specified, a task 810 receives user input that informs task 810 whether to accept the existing repeat factor or to increase the value of the repeat factor. Task 810 generally prevents the repeat factor from being modified to a shorter value because such a shorter value could potentially cause scheduling conflicts.

After task 810, a task 812 schedules the performance from the first playing time to the last playing time. The scheduling process associates the titles database data record or short title with data that describes the playing time. The process is repeated for a subsequent playing time. The subsequent playing time is calculated by adding the repeat factor to the previous playing time. The scheduling process continues until task 812 calculates a playing time which is after the last playing time. When this happens, task 812 has completed scheduling the selected performance. Together, tasks 808-812 operate as a process 814 that associates a performance's data record with timing data.

Upon the completion of process 814, an inquiry task 816 requests the user to indicate whether to repeat the scheduling process for another performance or channel, or to exit procedure 800. The preferred embodiment is configured to accommodate 28 different channels. Thus, a user specifies a schedule for 28 channels before an exhibition plan is complete. Different channels may be scheduled to provide overlapping or staggered exhibitions, as discussed above. However, those skilled in the art will recognize that any number of channels may be accommodated by the present invention. When user input instructs process 814 to repeat, program control returns to task 806, discussed above. When user input instructs process 814 to exit procedure 800, program control returns to task 302 (see FIGS. 3-4).

Figure 9:
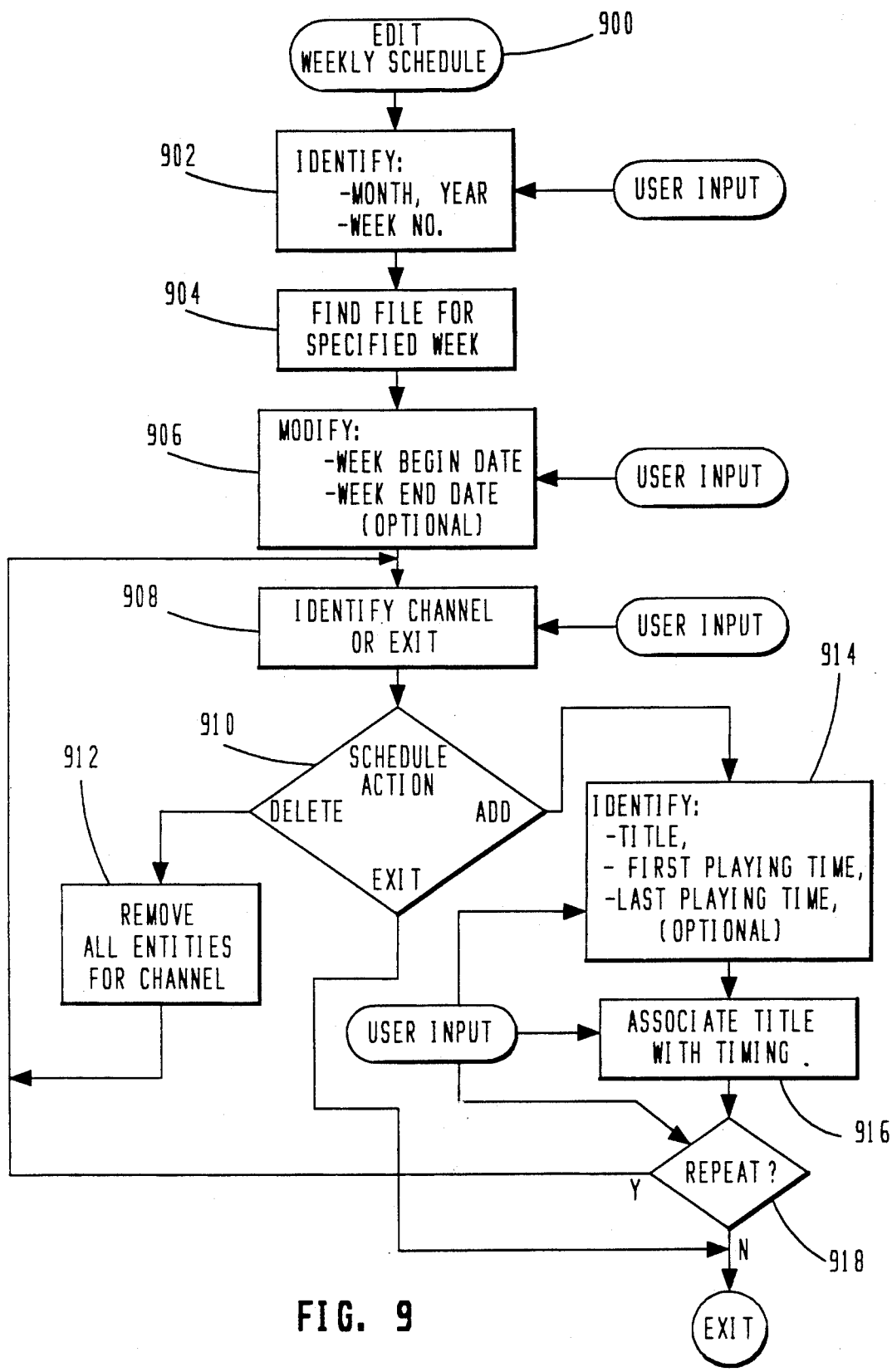
FIG. 9 shows a flow chart of an Edit Weekly Schedule procedure performed by the Schedule Manager segment of the preferred embodiment of the present invention.

FIG. 9 shows a flow chart of Modify Weekly Schedule procedure 900. As discussed above, procedure 900 causes the computer to modify or edit an existing exhibition plan for a specified week. In a task 902, procedure 900 received user input that identifies the year, month, and week of the weekly exhibition plan to be modified. As discussed above in connection with task 804 (see FIG. 8), this data is used to construct a file name for the file that contains the specified weekly schedule. After task 902, a task 904 verifies that the specified file exists and retrieves it. Next, a task 906 permits a user to optionally modify the week's begin date and/or end date.

After task 906, a task 908 receives user input that identifies a channel whose schedule may be modified or causes program control to exit procedure 900. When user input specifies a channel, an inquiry task 910 determines the type of scheduling action to take. A schedule for the channel may be deleted by routing program control to a task 912. Task 912 removes all entries from the weekly exhibition plan file that are related to the specified channel. After task 912, program control returns to task 908, discussed above.

Task 910 may route program control to a task 914 to add a schedule for the identified channel. Task 914 receives user input that specifies a performance's title, first playing time, and optional last playing time, as discussed above in connection with task 806 (see FIG. 8). After task 914, a task 916 performs the process of associating the titles database data record for the specified performance with timing data, substantially as discussed above in connection with process 814 (see FIG. 8). However, during task 916 a user may decrease a repeat factor when the default repeat factor has been previously increased. The repeat factor may not be decreased to a value less than its default value.

After task 916, an inquiry task receives user input that specifies whether to repeat the modification process for another channel or performance, or to exit. When the repeat option is selected, program control returns to task 908, discussed above. When either of tasks 910 and 918 cause control to exit procedure 900, program control proceeds to task 302 (see FIGS. 3-4).

As discussed above in connection with segment 306 of FIG. 3, a user may cause an exhibition plan for a particular month to be written to a disk. This exhibition plan includes title, timing, and channel data which collectively form a schedule along with a large portion of the data discussed above in TABLE I and associated with the performances' titles. At this point, the exhibitions have merely been scheduled. It is the job of the Inventory Manager process 62 (see FIG. 2) to manage the realization of this schedule. In other words, Inventory Manager process 62 is a tool that helps insure that the performances scheduled by Exhibition Schedule Manager 300 (see FIG. 3) are actually exhibited in accordance with the schedule.

FIG. 2 shows additional features of system 10 that specifically operate in conjunction with Inventory Manager process 62. In particular, each individual tape or media copy 30 has its own unique printed bar code 68 affixed thereto. Likewise, each location where a media copy 30 might possibly reside has its own unique location bar code 70 affixed thereto. For example, each drawer or shelf of library 32 has its own unique location code 70, and each of video players 17 and 18 have their own unique location codes 70. Bar codes 68 and 70 are all optically scannable by scanners 72 and 74. Scanner 72 is wire-coupled to computer 64 in a conventional manner, and scanner 74 is a conventional portable scanner which can periodically transfer data logged therein to computer 64 and receive data from computer 64. Scanners 72-74 and bar codes 68-70 are all conventional items which are well known to those skilled in the art. Their use in connection with Inventory Manager process 62 is discussed below. While the present invention utilizes bar codes for convenience, those skilled in the art will recognize that other types of scannable codes may be used as well.

Figure 10:
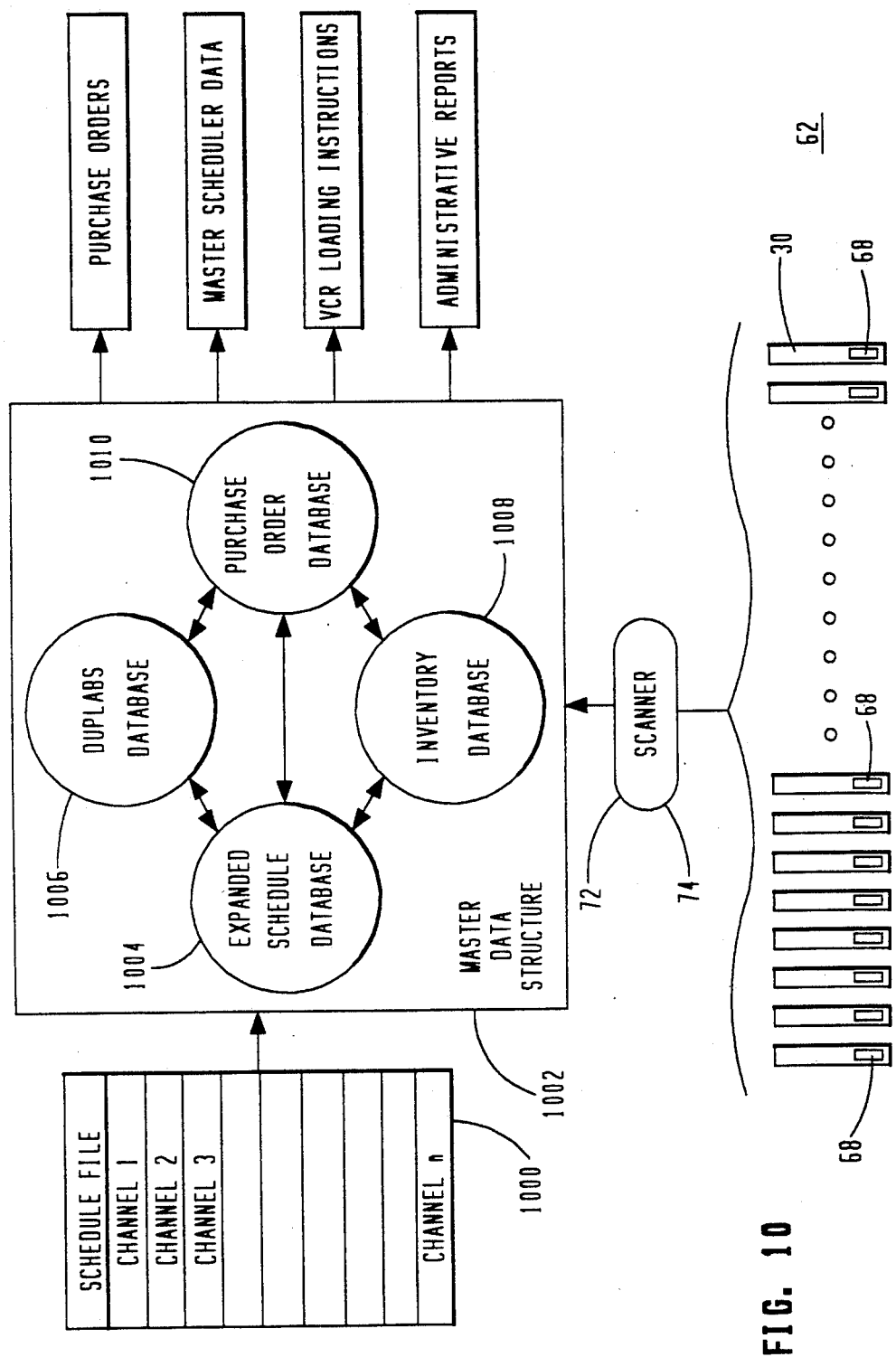
FIG. 10 shows a data flow block diagram of an Inventory Manager portion of the preferred embodiment of the present invention.

FIG. 10 shows a data flow block diagram of Inventory Manager process 62. Schedule file 1000 contains the above-discussed exhibition plan generated by Exhibition Schedule Manager 300 (see FIG. 3). Thus, file 1000 includes, for each channel or video player 17 of system 10 (see FIGS. 1-2), timing and title data for each scheduled performance along with data that describe the scheduled performances (see TABLE I). Inventory Manager process 62 receives this data and modifies it to fit within a master data structure 1002, which consists of an association of related data bases. In particular, the data from file 1000 primarily goes into an expanded schedule data base 1004, but it is first modified or expanded as discussed below. A duplab data base 1006 is formed primarily from data supplied by a user through a conventional keyboard (not shown). Data records in an inventory data base 1008 and a purchase order (PO) data base 1010 are initially formed when the expanded schedule data base 1004 is created from a given schedule file 1000. These records are augmented later by data input from scanners 72-74 (see FIG. 2). Scanners 72-74 provide, among other items, codes that identify specific media copies and specific locations. This data is periodically received so that data bases 1008 and 1010 remain current.

Inventory Manager process 62 retrieves data included in master data structure 1002 and transfers this data to portable scanner 74 and to paper, with the aid of a printer (not shown), in the form of various reports. Data transferred to portable scanner 74 generally represents instructions that a user should follow so that the schedule may be realized. For example, such instructions inform a user to get specific media copies from specified locations and to insert the specific media copies in specified video players 17 (see FIG. 2) at specified times.

The printed reports generated by Inventory Manager process 62 take numerous forms. For example, Manager 62 utilizes data in master data structure 1002 to generate purchase orders. In addition, Manager 62 prints the data required by master scheduler 20 (see FIGS. 1-2) to operate video players 17 (see FIG. 2) in accordance with the schedule and to display a video programming selection menu to customers. The user VCR loading instructions may be optionally printed rather than transferred to portable scanner 74, as discussed above, and various administrative reports may be generated in desired formats. Of course, those skilled in the art will recognize that while the preferred embodiment prints master schedule data, such data may alternatively be output to a disk or otherwise communicated to master scheduler 20 in a more automated fashion.

Figure 11:
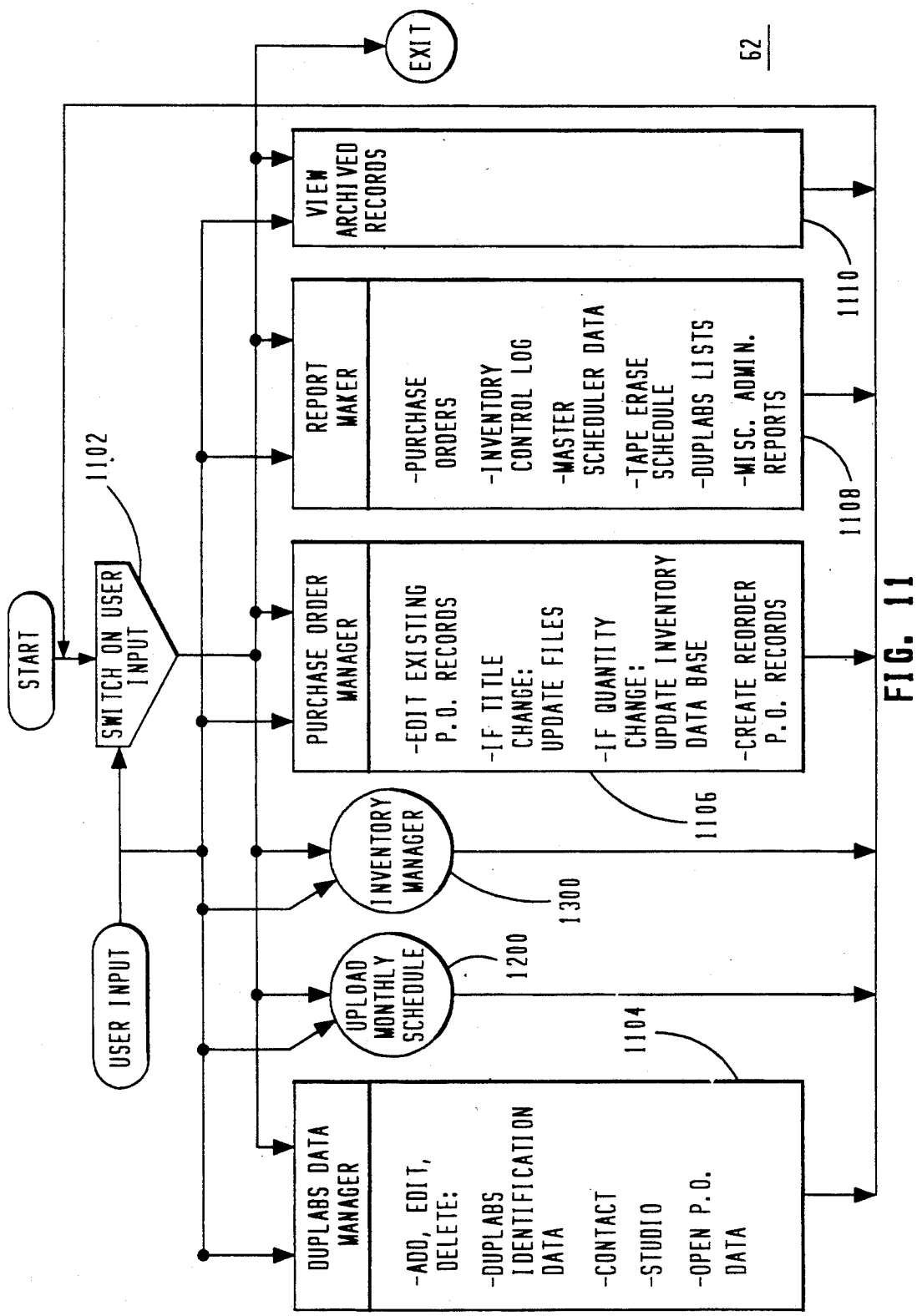
FIG. 11 shows a flow chart of the Inventory Manager process of the preferred embodiment of the present invention.

FIG. 11 shows a flow chart of Inventory Manager process 62. Inventory Manager process 62 is a process which is carried out in large part within a computer, such as computer 64, or any of computers 15, 20, or 66 (see FIG. 2). In addition to the above-discussed scanners 72-74, the computer which performs Inventory Manager process 62 preferably includes a video display, printer, disk or other permanent memory for long term data storage, and a keyboard or other device for transferring user input. Inventory Manager process 62 is controlled through computer instructions stored within computer memory (not shown).

Upon beginning Inventory Manager process 62, a switching task 1102 receives user input to determine which of several segments within Manager 62 to perform. Preferably, task 1102 displays a menu which identifies the possible segments that are available for the user to select. Once the user has selected a segment, task 1102 switches program control to the selected segment.

Task 1102 may, upon a user input selection, switch program control to a Duplabs Data Manager segment 1104. Duplabs Data Manager 1104 operates similarly to the above discussed Personal Information Manager 308 (see FIG. 3). Thus, segment 1104 allows a user to manage information about various duplabs (duplication laboratories) from which media copies of the scheduled performances may be obtained. This information is collected in duplabs data base 1006 (see FIG. 10). It may be added, edited, deleted, displayed and printed, primarily under control of user input from a keyboard. In the preferred embodiment, this information identifies the duplab, its address, phone numbers, and a personal contact at the duplab. In addition, each record includes the name of a studio from which performances may be licensed. Furthermore, when a prior arrangement with a duplab has established an open purchase order, the number of this purchase order and any associated amount may be included in each record. Since each record includes a studio data field, several records may exist for each duplab when a single duplab has arrangements with several different studios.

Task 1102 may, upon a user input selection, switch program control to an Upload Monthly Schedule segment 1200. Generally speaking, Inventory Manager process 62 uses Upload segment 1200 to retrieve, process, and merge the data from the schedule file 1000 (see FIG. 10) into master data structure 1002 (see FIG. 10). Upload Monthly Schedule segment 1200 is discussed below in connection with FIG. 12.

Task 1102 may, upon a user input selection, switch program control to an Inventory Manager segment 1300. Segment 1300 tracks all received media copies within system 10 (see FIGS. 1-2) and is discussed below in connection with FIGS. 13-17.

Task 1102 may, upon a user input selection, switch program control to a Purchase Order Manager segment 1106. Segment 1106 is used primarily in conjunction with PO data base 1010 (see FIG. 10). As discussed below in connection with FIG. 12, one of the tasks that Upload Monthly Schedule segment 1200 performs is the automatic generation of purchase order records within PO data base 1010. Purchase order records include data fields for those items that are required on purchase orders, such as the data discussed below in TABLE II.

TABLE II

| Data Element | Description |
| --- | --- |
| PO number | A number which identifies a purchase order. |
| Dup. Lab. | The name of the duplication laboratory that is licensed by the studio to make media copies of the performance from a master and from whom media copies are being ordered. |
| Title | The performance's listed title, which identifies the product being ordered. |
| Studio | The organization from which the performance is licensed. |
| Qty. Ordered | The number of media copies being ordered. |
| Delivery Date | The date by which all media copies are to be received. |
| PO Date | The date upon which the purchase order is issued. |
| Qty. Received | The number of media copies received so far |

| TABLE II-continued | |
|---|---|
| Data Element | Description |
| | under this purchase order. |

Segment 1106 allows a user to specify a title, then segment 1106 searches PO data base 1010 to find a purchase order record with the specified title. Segment 1106 permits the user to view all records which may have the same title before a selection is made. When the user has found a record of interest, segment 1106 permits the user to edit any field in the selected purchase order record. When all editing is complete, segment 1106 checks the Title data field to see if the title has been edited. If the title has been changed, segment 1106 then accesses data bases 1004 and 1008 (see FIG. 10) and automatically updates Title data elements in all related records in those data bases. Likewise, segment 1106 checks the Qty. Ordered data field to see if the quantity of media copies ordered has changed. If a change is detected, segment 1106 automatically accesses inventory data base 1008 and adds or deletes records therein so that the number of records in inventory data base 1008 matches the quantity of media copies ordered.

Segment 1106 additionally allows a user to create a reorder record. A reorder record might be needed if, for example, a tape becomes damaged and needs to be replaced. In such a situation, when a user specifies a title, schedule month, and reorder quantity, segment 1106 searches PO data base 1010 (see FIG. 10) to locate a record having the specified title for the specified schedule month. When this original record has been located, segment 1106 automatically makes a new purchase order record using the data elements, other than Qty. Ordered, from the original purchase order record. Furthermore, when a "reorder" record is created, segment 1106 automatically accesses inventory data base 1008 (see FIG. 10) and adds line items to correspond to the reordered quantity.

Task 1102 may, upon a user input selection, switch program control to a Report Maker segment 1108. Generally speaking, segment 1108 searches appropriate data bases in master data structure 1002 (see FIG. 10) for predetermined data elements, formats the data elements in predetermined formats, and prints the data at a printer (not shown). In particular, segment 1108 is used to actually print a purchase order using data from the above discussed purchase order records of PO data base 1010 (see FIG. 10). User input is permitted so that a user can specify which purchase orders to print. When a purchase order is printed, segment 1108 automatically inserts a current system date into the PO Date data field of all purchase order records printed. Thus, the date upon which a purchase order is printed is the date used within a corresponding purchase order record of PO data base 1010 to indicate when the related media copies were ordered.

Segment 1108 additionally, upon a user input selection, prints an inventory control log. In order to print the inventory control log, segment 1108 searches inventory and PO data bases 1008 and 1010 (see FIG. 10) to determine, for each ordered title, the date upon which media copies are due, the quantity ordered, the duplab from whom the media copies are ordered, the PO number, the quantity of media copies already received. This information may be used to manage the flow of media copies from various duplabs.

A user may request segment 1108 to produce a report that contains the data required by master scheduler 20 (see FIGS. 1-2). As discussed above, this report includes all data needed by master scheduler 20 for use in controlling VCRs 17 and 18 (see FIG. 2) and for providing customers information about upcoming programming over network 13 (see FIG. 1).

In addition, segment 1108, upon a user request, searches master data structure 1002, primarily in schedule data base 1004 (see FIG. 10), to find all records of titles for which an availability date has expired by a predetermined duration. As discussed above, performances are typically licensed under terms which require them to be exhibited only within a specified timing window. The ending date of this timing window is specified in data base 1004 as an "Available To" data element (see TABLE I). Segment 1108 searches for titles in which the Available To data element is preferably around 30 days prior to a current system date. These titles cannot be exhibited due to licensing arrangements. Accordingly, the media copies of such performances are candidates for being erased. Typically, licensing arrangements require such media copies to either be erased or returned to a duplab or studio by around this 30 day date. Once the selected titles have been located, segment 1108 accesses inventory data base 1008 to get codes that identify the specific media copies to be erased. These titles and codes, along with any other pertinent information, are printed out.

Segment 1108 makes other reports in a similar manner by searching master data structure 1002 (see FIG. 10) for predetermined data items and retrieving related information for printing. Such other reports provide duplab information and various administrative, marketing, and financial information.

Inventory Manager process 62 does not need to manage information related to titles for which all licensing obligations have been met and for which no media copies remain. Thus, when this situation occurs the related records are removed from master data structure 1002 (see FIG. 10) and placed in archive files (not shown). Task 1102 may, upon a user input selection, switch program control to a View Archived Records segment 1110. Segment 1110 allows a user to input information that identifies the desired records. Next, segment 1110 searches the archive files for the requested record(s), retrieves information included therein, and displays and optionally prints such information. This information is useful to maintain accountability for the licensing of performances.

After execution of each of segments 1104, 1200, 1300, 1106, 1108, and 1110, program control returns to task 1102, where a user may make another selection or exit Inventory Manager process 62.

Figure 12:
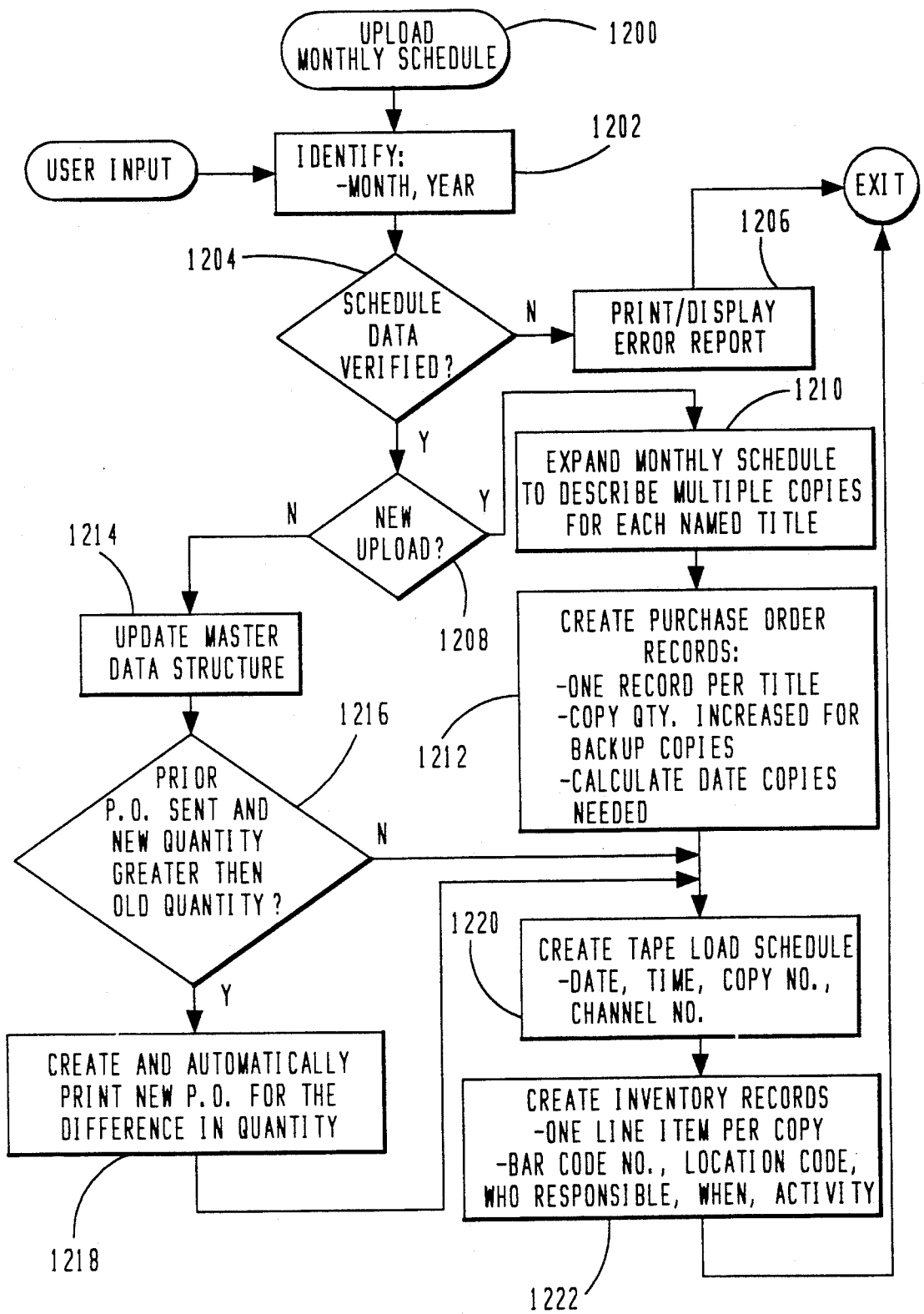
FIG. 12 shows a flow chart of an Upload Monthly Schedule segment of the Inventory Manager of the present invention.

FIG. 12 shows a flow chart of tasks performed by Upload Monthly Schedule segment 1200, which was briefly discussed above in connection with FIG. 11. Initially, a task 1202 of segment 1200 requests a user to supply a month and year which characterizes the period in time to which a schedule file 1000 (see FIG. 10) applies. After a user has supplied this information, an inquiry task 1204 determines whether this schedule can be verified. Specifically, task 1204 verifies that the specified transfer file is available for uploading. If the file is not available, a task 1206 prints or displays an error report, and program control exits segment 1200 and returns to task 1102 (see FIG. 11).

If the appropriate schedule file 1000 (see FIG. 10) appears to be available, task 1204 then accesses the file to test for duplab—studio matches. As discussed above, Exhibition Schedule Manager 300 (see FIG. 3) and Inventory Manager process 62 (see FIG. 11) independently maintain data which identify and link duplabs to studios. Task 1204 determines whether all duplabs and studios identified in schedule file 1000 and associated with one another in schedule file 1000 are likewise identified and associated within duplabs data base 1006 (see FIG. 10). If the duplabs and studios do not match, task 1206 prints or displays an error report, and program control exits segment 1200 and returns to task 1102 (see FIG. 11). A user can then take appropriate corrective action before again attempting to run segment 1200.

When task 1204 verifies the schedule data, an inquiry task 1208 determines whether the current schedule file 1000 (see FIG. 10) is already represented within master data structure 1002 (see FIG. 10) or whether it presents a new schedule. When file 1000 presents a new schedule, a task 1210 processes and expands this schedule. Prior to expansion, the schedule generally specifies that various titles are to be performed at specific times on specified channels. After expansion, the schedule associates individual media copies of titles with the schedule's timing and channel data. The expanded schedule is stored in schedule data base 1004 (see FIG. 10).

Task 1210 may use any convenient algorithm, including schedule simulation, to expand the schedule. As a result of this expansion, the schedule specifies not only title, channel, and timing data, but media copy data as well. For example, a schedule may specify that copies 1, 2, 3, and 4, of a predetermined title are to simultaneously play with offset starting times on channels 11, 12, 13, and 14, respectively, beginning on a specified date. Then, at a later date copies 1, 2, 3, and 4 are to be replaced with copies 5, 6, 7, and 8 of the same title because the number of playings of media copies 1, 2, 3, and 4, has become large enough for the chances of a tape failure to be unacceptably high. In the preferred embodiment, task 1210 assigns replacement copies to the schedule at a point in the schedule where predecessor copies have been scheduled for around 50 playings. Accordingly, task 1210 expands the schedule to incorporate multiple media copies for each title.

After task 1210, a task 1212 creates purchase order records in PO data base 1010 (see FIG. 10). The purchase order records were discussed above in connection with segment 1106 (see FIG. 11) and Table II. Task 1212 creates a new record for each title in schedule file 1000 (see FIG. 10). Much of the data needed to complete a purchase order record is obtained from schedule file 1000 and duplabs data base 1004. Task 1212 then calculates a number for the Qty. Ordered field (see TABLE II) of the records. Task 1212 determines that the quantity to order is the number of media copies scheduled above in task 1210, increased by a predetermined number of media copies to serve as backups. In the preferred embodiment, task 1212 automatically increases the number of scheduled copies by one.

In addition, task 1212 automatically calculates a date for the Delivery Date field of the purchase order records. The delivery date is automatically set sufficiently early so that potential delivery problems may be detected well in advance of a scheduled performance and so that corrective action may be effectively taken when needed without impacting the schedule. In the preferred embodiment, the delivery date is calculated to be the beginning of the month prior to the month being scheduled by schedule file 1000, or as soon thereafter as possible. Task 1212 may advantageously examine the Studio data field and vary the delivery date depending upon the identified studio. Thus, the different release procedures adopted by different studios are automatically accommodated.

Task 1212 leaves certain data fields of the newly created purchase order records empty or blank. In particular, the PO Date field is left blank in task 1212 and completed when a purchase order is printed, as discussed above in connection with segment 1108 (see FIG. 11). In addition, the Qty. Received field may be left blank or set to a zero at this point.

As discussed above, tasks 1210 and 1212 are performed only when schedule file 1000 (see FIG. 10) presents a new schedule to master data structure 1002 (see FIG. 10). When task 1208 determines that schedule file 1000 is already represented within master data structure 1002, segment 1200 performs a task 1214. Task 1214 updates existing records within schedule and purchase order data bases 1004 and 1010, respectively, rather than create new records. However, as shown in an inquiry task 1216, the prior PO record is examined before it is updated. If task 1216 determines that the purchase order corresponding to an affected purchase order record has not yet been printed, then the record is updated. If the purchase order has been printed and the Qty. Ordered field indicates a number that is greater than or equal to the quantity that is now needed, the purchase order record is not altered. On the other hand, if task 1216 determines that the purchase order has been printed and the Qty. Ordered field indicates a quantity less than the quantity now needed, an new purchase order record is made in a task 1218. The determination of whether a purchase order has been printed may be made by examining the PO date field, which is blank until the purchase order is printed.

The new purchase order record generally has the same data as the old purchase order record. However, the new purchase order record specifies the difference between the old and new needed quantities in the Qty. Ordered field. Likewise, the PO numbers may be different. After the new purchase order record is created, task 1218 automatically prints the new purchase order.

After either of tasks 1212 or 1218, a task 1220 takes the expanded monthly schedule and creates a tape load schedule. The tape load schedule is a list that specifies when tapes need to be loaded into VCRs 17 (see FIG. 2), the particular copies of various titles to use, and the particular ones of VCRs 17 that are affected.

After task 1220, a task 1222 creates inventory records in inventory data base 1008 (see FIG. 10) to accommodate the media copies that are indicated in the newly created purchase order records from tasks 1212 and 1218. Each inventory record includes a line item for a single, unique media copy. Each inventory record includes data fields similar to those described below in TABLE III.

TABLE III

| Data Element | Description |
| --- | --- |
| Title | The performance's listed title. |
| Copy No. | A number that identifies a single media copy of a title and that links the record to the schedule data base. |

TABLE III-continued

| Data Element | Description |
| --- | --- |
| Copy Bar Code | An alphanumeric code which is encoded in a printed bar code format and affixed to the corresponding media copy upon receipt. |
| Location Bar Code | An alphanumeric code that describes a place at which the corresponding media copy is located. |
| Employee Id. | A code that uniquely identifies an employee who has had contact with the corresponding media copy. |
| Time | A date and time stamp for indicating when an activity concerning the corresponding media copy occurred. |
| —other— | Codes that specify activities and the like. |

Since, at this point, the media copies for which the above-listed inventory records have been created have not yet been received, only the Title and Copy No. fields are completed by task 1222. The other fields are completed and maintained later to describe and track received media copies.

After task 1222, program control exits Upload Monthly Schedule segment 1200 and returns to task 1102 (see FIG. 11).

Figure 13:
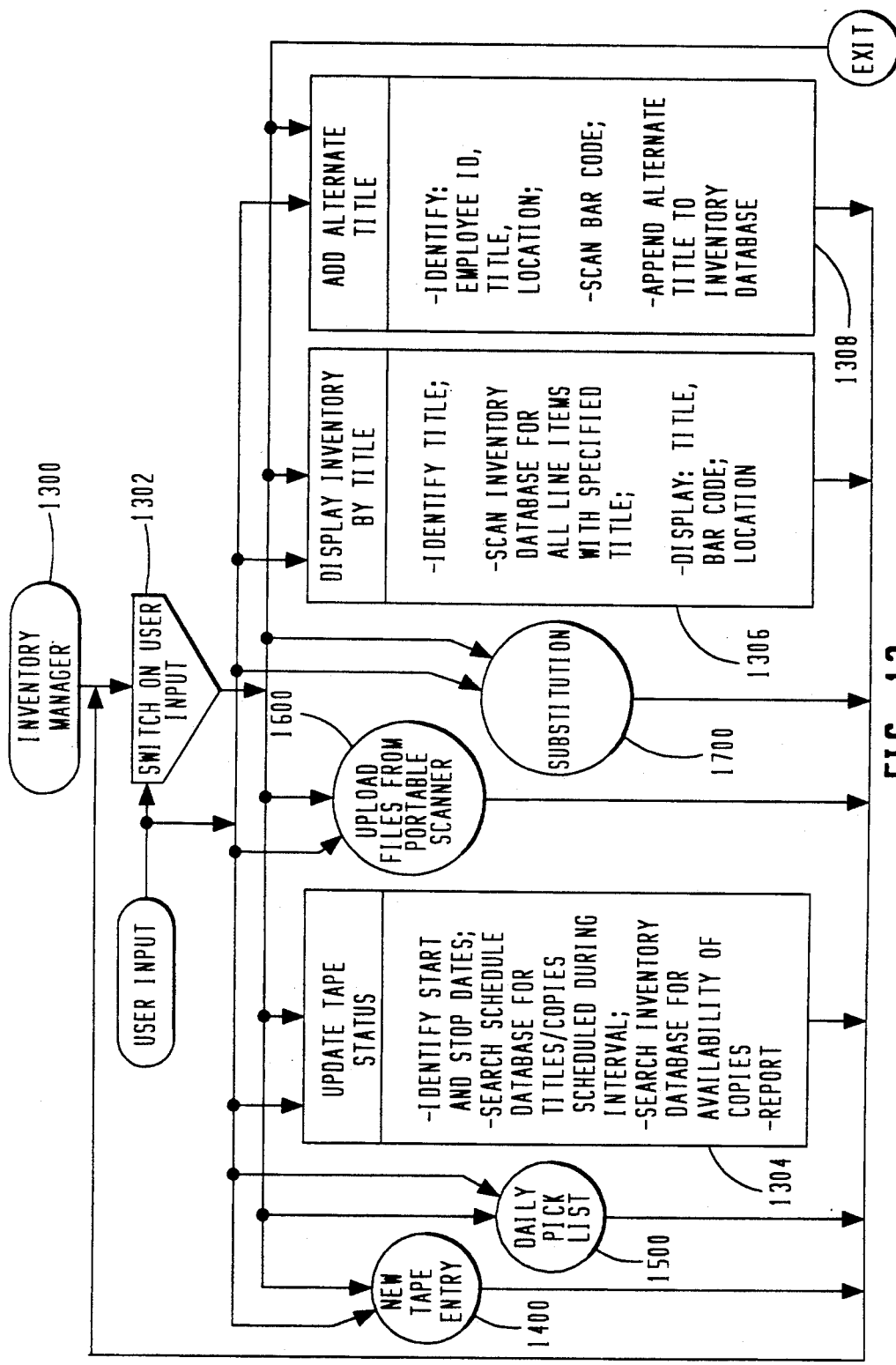
FIG. 13 shows a flow chart of an Inventory Manager segment of the Inventory Manager process of the present invention.

FIG. 13 shows a flow chart of Inventory Manager segment 1300, which was briefly discussed above in connection with FIG. 11. Initially, a switching task 1302 receives user input to determine which of several procedures within segment 1300 to perform. Preferably, task 1302 displays a menu which identifies the possible procedures that are available for the user to select. Once the user has selected a procedure, task 1302 switches program control to the selected procedure.

Task 1302 may, upon a user input selection, switch program control to a New Tape Entry procedure 1400. Generally speaking, procedure 1400 is performed to process newly received media copies so that they may be tracked by Inventory Manager process 62 (see FIG. 11). Procedure 1400 is discussed below in connection with FIG. 14.

Task 1302 may, upon a user input selection, switch program control to a Daily Pick List procedure 1500. Procedure 1500 provides a user with instructions that specify particular media copies to get and insert into specified VCRs 17 (see FIG. 2) at specified times for an upcoming day. Procedure 1500 is discussed below in connection with FIG. 15.

Additionally, task 1302 may, upon a user input selection, switch program control to an Update Tape Status procedure 1304. Procedure 1304 first requests the user to enter start and stop dates. Preferably, the user will enter dates corresponding to a future week. When the dates have been specified, procedure 1304 scans schedule data base 1004 (see FIG. 10) to identify the media copies that are scheduled for playing during the specified interval. Once these media copies have been identified, procedure 1304 scans inventory data base 1008 (see FIG. 10) to determine if the identified media copies are located at a place which suggests that the media copies are available. If any media copies have not been received or are located in a place which suggests that they are not available, an availability report that identifies all "unavailable" media copies is either displayed or printed. The user may use this availability report to correct any unavailability problems so that the schedule for the specified interval can be met.

Task 1302 may also, upon a user input selection, switch program control to an Upload Files From Portable Scanner procedure 1600. Generally speaking, procedure 1600 is performed to transfer data collected in portable scanners 74 (see FIG. 2) to master data structure 1002 (see FIG. 10). Procedure 1600 is discussed below in connection with FIG. 16.

Task 1302 may, upon a user input selection, switch program control to a Substitution procedure 1700. Substitution procedure 1700 is performed whenever a user wishes to substitute one media copy for another media copy. Procedure 1700 allows master data structure 1002 (see FIG. 10) to respond to the substitution. Substitution procedure 1700 is discussed below in connection with FIG. 17.

Additionally, task 1302 may, upon a user input selection, switch program control to a Display Inventory By Title procedure 1306. Procedure 1306 requests the user to enter a title. Next, procedure 1306 scans inventory data base 1008 to get all inventory records for the identified title. The title, bar code, and location from these records is displayed.

Task 1302 additionally, upon a user input selection, switches program control to an Add Alternate Title procedure 1308. Procedure 1308 creates inventory records for titles that have not been obtained through the above-discussed purchase order system. In particular, procedure 1308 requests the user to enter an employee id. number and a performance's title. When these items have been entered, the user is requested to scan a bar code affixed to the media copy, and the information is appended to inventory data base 1008 (see FIG. 10).

After execution of any of procedures 1400, 1500, 1304, 1600, 1700, 1306, and 1308, program control returns to task 1302, where a user may make another selection or exit Inventory Manager segment 1300.

Figure 14:
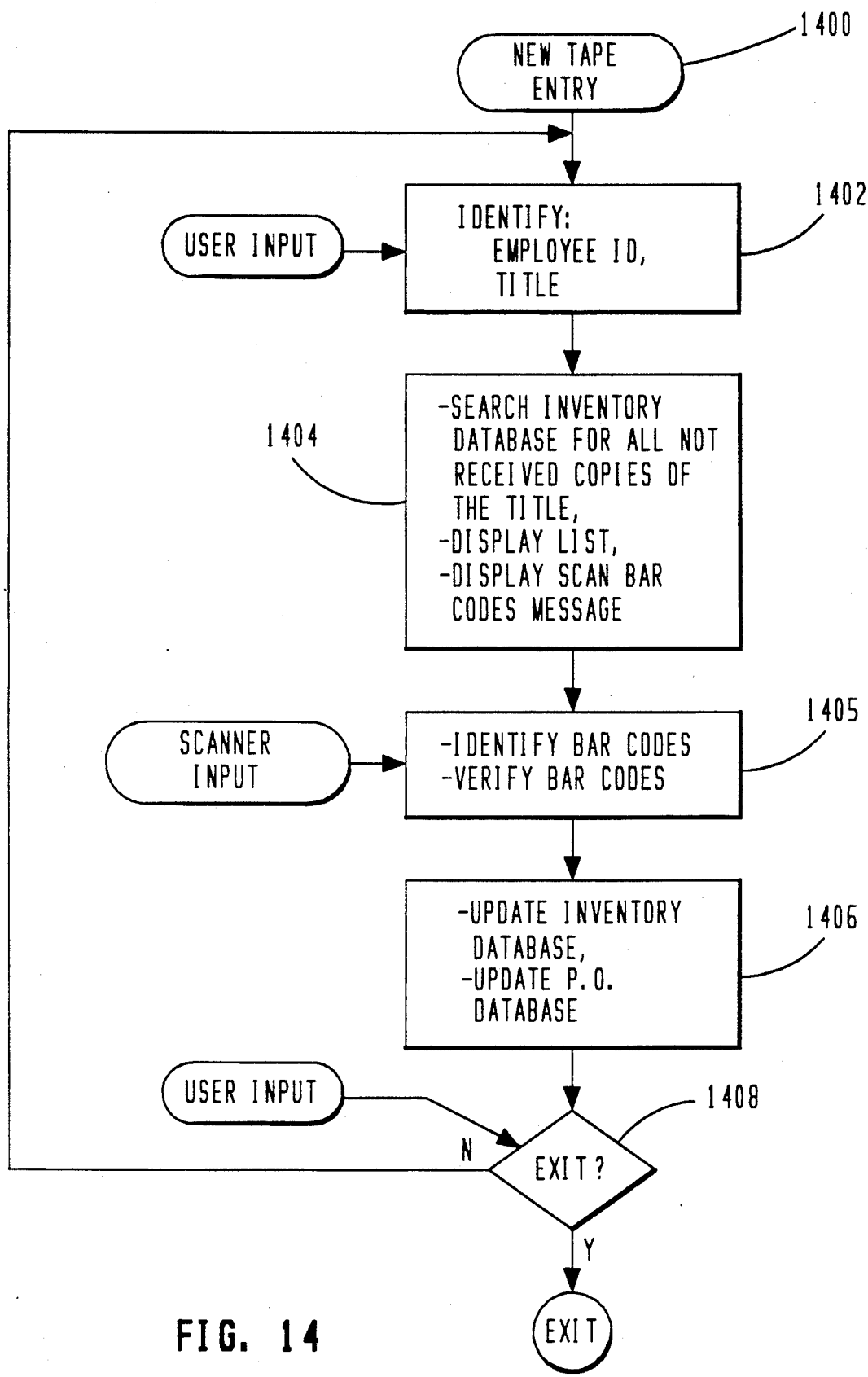
FIG. 14 shows a flow chart of a New Tape Entry procedure of the Inventory Manager segment of the present invention.

FIG. 14 shows a flow chart of tasks performed by New Tape Entry procedure 1400, which was briefly discussed above in connection with FIG. 13. Procedure 1400 is performed when new media copies are received from a duplab. Initially, a task 1402 requests a user to enter the user's employee id. number and the title for newly received media copies. When the user has supplied this information, a task 1404 searches inventory data base 1008 (see FIG. 10) for all inventory records which: 1) have the same title that the user entered above in task 1402 and 2) indicate that the corresponding media copy has not yet been received. Task 1404 may determine that media copies have not yet been received by examining various data fields of the inventory records (see TABLE III) for blank or otherwise initialized entries. Next, task 1404 displays a list of these records and displays a request for the user to scan bar codes affixed to each of the media copies.

If the user has not previously done so, unique printed bar codes 68 (see FIGS. 2 and 10) are then affixed to the newly received media copies. The user may scan these bar codes with scanner 72 (see FIG. 2) whereupon a task 1405 receives the codes detected by scanner 72 and places the codes in the Copy Bar Code data fields (see TABLE III) of the displayed inventory records. Preferably, task 1405 allows the user to scan several media copies in sequence while automatically cycling through inventory records and recording bar codes therein. In addition, task 1405 may instruct the user to repeat the bar code learning process to verify that all bar codes have been learned correctly.

After task 1405, a task 1406 updates inventory data base 1008 with the newly learned bar codes. In addition, task 1406 automatically assigns an initial predetermined value to the Location Bar Code data fields (see TABLE II) for each of the selected inventory records. In the preferred embodiment, this initial location bar code indicates that the newly received copies are located at a quality check location. A date and time stamp may advantageously be entered into the inventory record as well. Moreover, task 1406 updates the Qty. Received field (see TABLE II) of the appropriate purchase order record of PO data base 1006 (see FIG. 10) to reflect the number of media copies which have been received and entered into master data structure 1002 (see FIG. 10).

After task 1406, an inquiry task 1408 asks whether the user wishes to exit procedure 1400. If the user responds in the negative, then program control returns to task 1402, discussed above. If the user responds in the positive, then program control exits procedure 1400 and returns to task 1302 of Inventory Manager segment 1300 (see FIG. 13).

Figure 15:
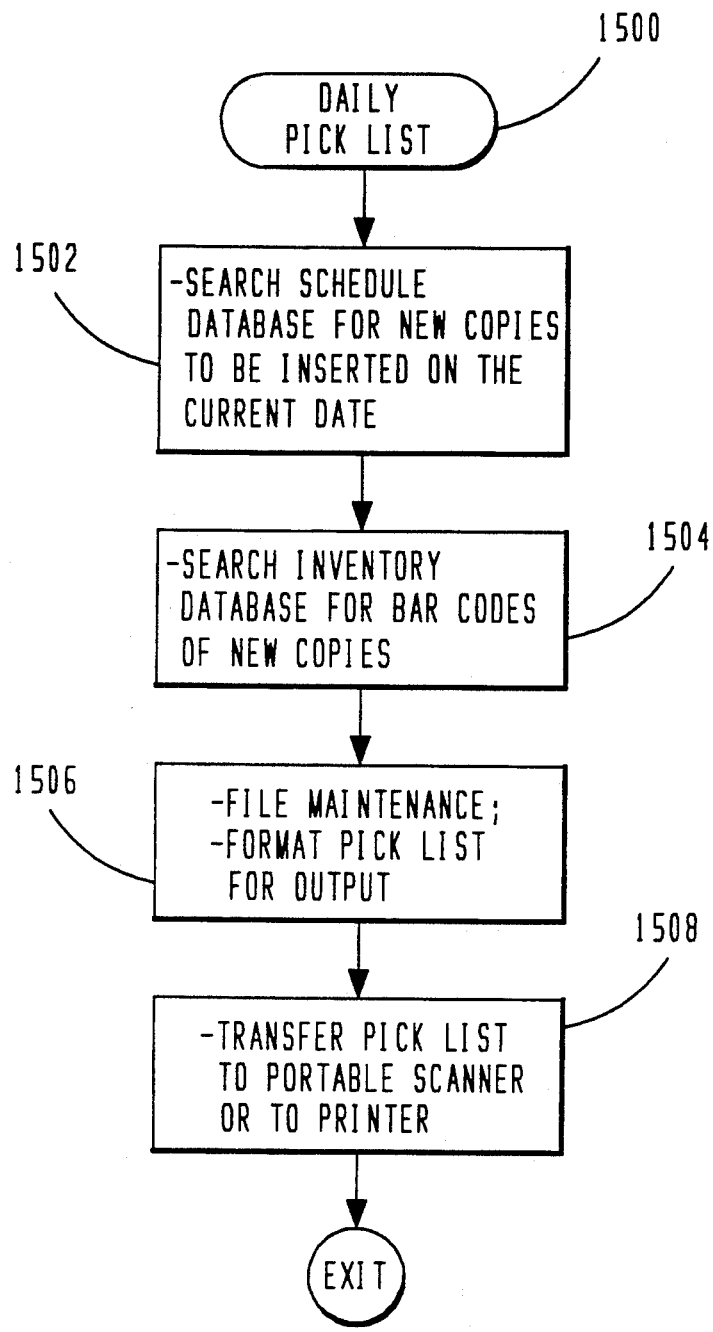
FIG. 15 shows a flow chart of a Daily Pick List procedure of the Inventory Manager segment of the present invention.

FIG. 15 shows a flow chart of tasks performed by Daily Pick List procedure 1500, which was briefly discussed above in connection with FIG. 13. Procedure 1500 is preferably performed by an employee at the beginning of a work shift. A task 1502 gets a system date, which reflects the current date, and searches schedule data base 1004 (see FIG. 10) to identify all media copies that are scheduled for initial playing during the indicated day. Next, a task 1504 searches inventory data base 1008 (see FIG. 10) to identify the copy bar codes of those media copies identified above in task 1502. These copy bar codes are associated with timing and channel or location data from the identified records of schedule data base 1004 to form a pick list for the current date. A task 1506 formats this pick list as necessary for output and performs file maintenance. The file maintenance erases a backup file that contained a pick list for the day before the previous day, and renames the current pick list file, which now contains data for the prior day, to serve as the backup file. The current date's pick list is then stored in a current pick list file.

Next, a task 1508 outputs the current date's pick list. Preferably, this pick list is downloaded into portable scanner 74 (see FIG. 2), but it may alternatively be printed. The pick list provides instructions which guide a user to select scheduled media copies and insert the scheduled media copies into scheduled VCRs 17 (see FIG. 2) at scheduled times. After task 1508, program control exits procedure 1500 and returns to task 1302 of Inventory Manager segment 1300 (see FIG. 13).

Figure 16:
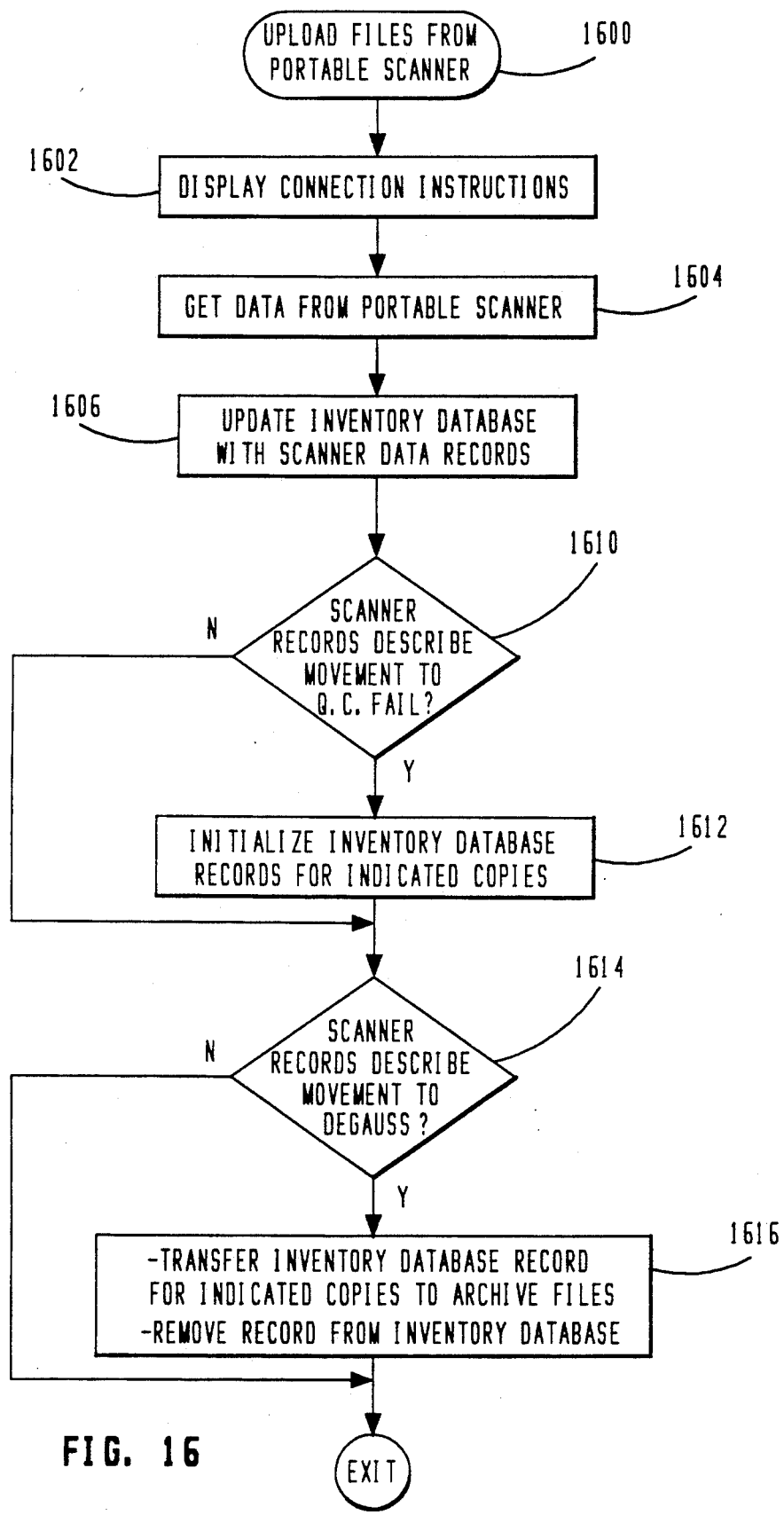
FIG. 16 shows a flow chart of an Upload Files From Portable Scanner procedure of the Inventory Manager segment of the present invention.

FIG. 16 shows a flow chart of tasks performed by Upload Files From Portable Scanner procedure 1600, which was briefly discussed above in connection with FIG. 13. During a work shift, an employee may have occasion to move media copies around. For example, media copies may be moved from library 32 to VCRs 17 (see FIG. 2) as discussed above, and vice versa. New media copies may be received, passed through quality check, and stored in library 32. In addition, media copies may be moved around within the shelves or drawers of library 32 or old media copies may be removed from library 32 and destroyed. In the preferred embodiment of the present invention, all these movements and others are recorded by portable scanners 74 (see FIG. 2). A user must enter his or her employee id. in order to log data within a scanner 74. A scanner 74 may be operated by pressing a button (not shown) which signals that a movement or activity has occurred. Next, the user may scan the bar code 68 (see FIG. 2) of the affected media copy and the bar code 70 (see FIG. 2) of the location where the media copy is placed or inserted. The scanner 74 retains these bar codes and automatically attaches a date and time stamp to its record of the transaction. Consequently, when media copies are moved around, portable scanner 74 contains a record of the movements.

Procedure 1600 is preferably performed periodically by an employee after handling media copies. At a minimum, task 1600 is preferably performed once daily at the end of a work shift. Procedure 1600 performs a task 1602 to display instructions to connect a portable scanner 74 to computer 64 (see FIG. 2). Next, a task 1604 downloads the data logged within portable scanner 74 into computer 64. As shown at a task 1606, this data is used to update inventory data base 1008 (see FIG. 10). Generally speaking, this data is simply stored in the corresponding fields (see TABLE III) of the affected inventory records.

However, as shown in an inquiry task 1610, procedure 1600 also tests for a special situation. In particular, a user may indicate that a media copy has failed its initial quality check by entering into scanner 74 a predetermined movement code which indicates that the media copy has been moved to a quality check failure location. After failing quality check, the media copy is simply returned to its originating duplab. If task 1610 determines that a media copy has failed quality check, then the inventory record for that media copy is re-initialized and the Qty. Received field of the corresponding purchase order record is decremented in a task 1612. In other words, all records of the received media copy are erased from master data structure 1002 (see FIG. 10), and master data structure 1002 then substantially indicates that the media copy has not been received.

When task 1610 determines that a failed quality check code was not received from scanner 74 or after task 1612 finishes, program control proceeds to an inquiry task 1614. A user may indicate that a media copy has been degaussed, destroyed, returned, or otherwise reached the end of its useful life by entering into scanner 74 a predetermined movement code which indicates that the media copy has been moved to an end-of-life location. When task 1614 detects the end-of-life signal, a task 1616 transfers the inventory records related to the associated media copy to archive files and removes the records from inventory data base 1008 (see FIG. 10). Accordingly, inventory data base 1008 is purged of inactive records. When task 1614 determines that an end-of-life code was not received from scanner 74 or after task 1616 finishes, program control exits procedure 1600 and returns to task 1302 of Inventory Manager segment 1300 (see FIG. 13).

Figure 17:
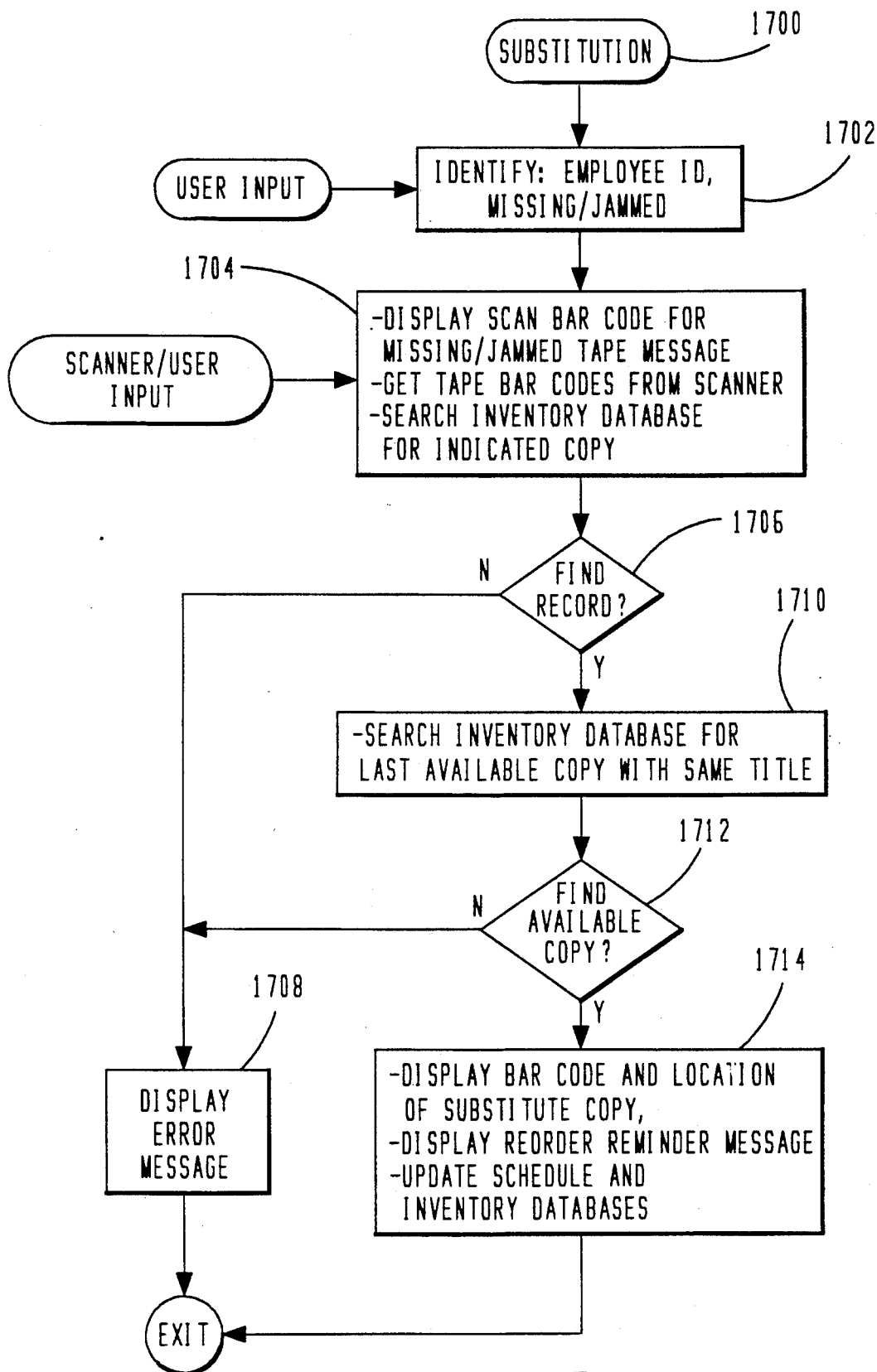
FIG. 17 shows a flow chart of a Substitution procedure of the Inventory Manager segment of the present invention.

FIG. 17 shows a flow chart of tasks performed by Substitution procedure 1700, which was briefly discussed above in connection with FIG. 13. Substitution procedure 1700 is performed to compensate for real world problems that crop up from time to time while operating system 10 (see FIG. 1). In particular, a media copy may simply be missing due to theft, being misplaced, accidental degaussing, or the like. Likewise, a media copy that has passed the above-discussed quality check may fail at a later time due to any one of numerous causes, such as becoming jammed while being played in a VCR 17 (see FIG. 2). When such problems crop up, another media copy needs to be substituted for the missing or jammed media copy in order to keep the schedule. The substitution must be reflected both within Inventory Manager process 62 (see FIG. 13) and in the operation of video players 17. It is procedure 1700 that is used to authorize the substitution and to maintain master data structure 1002 (see FIG. 10) in accordance with the substitution.

A task 1702 requests a user to enter the user's employee id. and to specify whether the substitution is for a missing or jammed media copy. The substitution type data (i.e. whether missing or jammed) is retained to generate statistics related to the problems that are cropping up. Such statistics are useful in reducing such problems. For example, such statistics may identify a particular duplab whose media copies are more prone to failure or a particular situation which tends to lead to missing media copies. Once such a duplab or situation is identified, corrective action may be taken.

After a user enters the substitution type data in task 1702, a task 1704 displays a message that requests the user to scan or otherwise enter the bar code affixed to the media copy of the jammed or missing tape. Of course, a jammed tape's bar code is scannable, but if a media copy is missing, then the user may enter its bar code at a computer keyboard. Once the bar code has been entered, task 1704 searches inventory data base 1008 (see FIG. 10) to find the inventory record with which the bar code is associated.

Next, an inquiry task 1706 determines whether the search performed in inventory data base 1008 was successful. If the search was not successful, then procedure 1700 cannot recognize the bar code for the missing or jammed tape. A task 1709 displays an appropriate error message, which informs the user that the specified media copy cannot be located in master data structure 1002 (see FIG. 10), then program control exits procedure 1700. The user may take corrective action, such as verify that the bar code entered above in task 1704 was correct.

If task 1706 can find the inventory record of the missing or jammed media copy, then a task 1710 searches inventory data base 1008 (see FIG. 10) for another record that has the same title as the missing or jammed tape. In particular, task 1710 searches for the last listed record with the selected title and with a Location Bar Code that indicates that the associated media copy is in an available location, such as in library 32 (see FIG. 2). The last copy will be the back up copy, if available. Media copies which are listed as being loaded in channels are viewed as being unavailable.

After task 1710, an inquiry task 1712 determines whether the search performed by task 1710 was successful. If the search was unable to locate an available media copy having the same title as the missing or jammed media copy, then program control proceeds to task 1708 which displays an appropriate error message. The error message displayed in this situation by task 1708 may warn the user that no substitute media copies are available. After task 1708 program control exits procedure 1700.

On the other hand, when task 1712 determines that the search performed in task 1710 was successful, a task 1714 displays the bar code and location of the substitute media copy. The user may utilize this information to locate and identify the selected substitute for the missing or jammed media copy. In addition, task 1714 displays a message that reminds the user to consider reordering the replacement tape. Inventory Manager process 62 (see FIG. 11) may assist in making a reorder purchase order as discussed above in connection with segment 1106 (see FIG. 11). However, the user may choose not to make a reorder purchase order when a missing/jammed problem crops up near the final stages of a program's exhibition. Furthermore, task 1714 automatically updates schedule and inventory data bases 1004 and 1008, respectively, to reflect the substitution. In particular, task 1714 modifies schedule data base 1004 to assign the substitution media copy in the schedule at all times and on all channels for which the missing/jammed media copy had previously been scheduled. Movement of the missing/jammed media copy to an appropriate location code is also recorded.

After task 1714, program control exits substitution procedure 1700 and returns to task 1302, discussed above in connection with FIG. 13.

In summary, the present invention provides a method for efficiently and accurately managing exhibitions of performances. The method of the present invention adapts one or more computers to manage the exhibition of performances so that only a few persons are needed to control a network. In particular the present invention collects and manages, in a single place, the information needed to schedule exhibitions for the network. Moreover, safeguards are provided to reduce scheduling mistakes. The present invention is adapted to meet the needs of pay-per-view services, and particularly the needs of near video on demand (NVOD) services, due to its ability to manage multiple channel and repeat scheduling. In addition, the present invention manages the acquisition and inventory of media copies of scheduled performances so that only a few persons need be involved to insure that the actual exhibitions of performances occur in accordance with the schedule. The number of needed copies and the delivery dates are automatically calculated based on the schedule so that users need not be bothered by these details. In addition unique media copy codes are assigned to received media copies and unique location codes are assigned to potential locations where the media copies might possibly reside to track and provide accountability for the received media copies.

The present invention has been described above with reference to a preferred embodiment. Additional details related to this preferred embodiment may be obtained by referring to a computer software listing deposited in the U.S. Copyright Office in connection with U.S. Copyright Registration No. TX437607. However, those skilled in the art will recognize that changes and modifications may be made in this preferred embodiment without departing from the scope of the present invention. For example, the exhibition and inventory managers of the present invention need not be used in connection with delivery of taped video, but may be used for audio performances, live performances, and performances recorded on other media. These and other changes and modifications which are obvious to those skilled in the art are intended to be included within the scope of the present invention.

What is claimed is:

1. A method of efficiently and accurately managing the exhibition of predetermined performances throughout an interval of time, said method comprising the steps of:

entering data describing said predetermined performances into a computer, each of said performances having a unique data record associated therewith, said entering step further comprising the steps of:

including data describing run times for said predetermined performances in said data records; and automatically calculating repeat factors for said predetermined performances, said repeat factors defining minimum intervals between beginning times for two back-to-back performances and said repeat factors being greater than said run times.

2. A method as claimed in claim 1 wherein said automatically calculating step forces said repeat factors to take one of a plurality of discrete values.

3. A method as claimed in claim 1 wherein said entering step additionally comprises the steps of:

modifying one of said data records;

determining whether said run time for said modified data record has been altered; and if said run time of said modified data record has been altered, calculating a new repeat factor.

4. A method as claimed in claim 3 wherein said entering step additionally comprises the step of:

determining whether said repeat factor for said modified data record has been altered; and if said repeat factor of said modified data record has been altered, instructing a user to reschedule exhibitions of the one of said performances that corresponds to said modified data record.

5. A method as claimed in claim 1 wherein:

said specifying step comprises the step of receiving information identifying a first playing time for said one of said performances;

said associating step comprises the steps of receiving information identifying said record for said one of said performances, and storing said record identifying information in relation to said first playing time; and said repeating step comprises the step of calculating a second playing time by adding said repeat factor to said first playing time.

6. A method as claimed in claim 5 wherein said specifying step additionally comprises the step of receiving information identifying a last playing time for said one of said performances; and said repeating step calculates additional playing times until one of said additional playing times occurs after said last playing time.

7. A method as claimed in claim 5 wherein said associating step additionally comprises the steps of:

displaying said repeat factor for user acceptance and modification;

allowing said user to increase said repeat factor; and
preventing said repeat factor from being decreased.

8. A method as claimed in claim 2 wherein:

said performances are exhibited by playing tapes of said performances;

said entering step additionally comprises the step of automatically calculating repeat factors for said predetermined performances, each repeat factor specifying a minimum interval between beginning times for two back-to-back playings of a single tape of a performance, and each repeat factor being greater than a corresponding run time for said performance to compensate for rewinding said tape and to force said repeat factor to take one of a plurality of discrete values.

9. A method of efficiently and accurately managing the exhibition of predetermined performances throughout an interval of time, said method comprising the steps of:

entering data describing said predetermined performances into a computer, each of said performances having a unique data record associated therewith, wherein said entering step comprises the step of including data describing performance titles for said predetermined performances in said data records;

automatically calculating short titles for said performances, said short titles being formed from characters in corresponding ones of said titles;

displaying said short titles for user acceptance and modification;

allowing said user to modify said short titles;

including said short titles in said data records;

specifying timing data to said computer, said timing data describing when to exhibit one of said performances;

associating said record for said one of said performances with said timing data within said computer;

repeating said associating step to produce an exhibition plan; and controlling a video server to exhibit said predetermined performances in accordance with said plan.

10. A method of efficiently and accurately scheduling the exhibition of a first plurality of performances on a second plurality of channels, said method comprising the steps of:

entering data identifying said performances and run times therefor into a computer, each of said performances having a unique data record associated therewith;

calculating repeat factors for said performances, said repeat factors being greater than corresponding run times;

storing said repeat factors with corresponding data records;

receiving information identifying a channel for which exhibitions of one of said performances are to be scheduled;

receiving information identifying a first playing time for said one of said performances;

receiving information identifying said data record for said one of said performances;

associating said data record identifying information relative to said first playing time;

calculating a second playing time substantially by adding said repeat factor to said first playing time; and associating said data record identifying information relative to said second playing time.

11. A method as claimed in claim 10 additionally comprising the step of repeating said first playing time receiving, data record receiving, first playing time associating, calculating, and second playing time associating steps for each of said first plurality of performances.

12. A method as claimed in claim 10 wherein said entering step additionally comprises the steps of:

modifying one of said data records;

determining whether said run time for said modified data record has been altered; and if said run time of said modified data record has been altered, calculating a new repeat factor.

13. A method as claimed in claim 12 wherein said entering step additionally comprises the step of:

determining whether said repeat factor for said modified data record has been altered; and if said repeat factor of said modified data record has been altered, instructing a user to reschedule exhibitions of the one of said performances that corresponds to said modified data record.

14. A method as claimed in claim 10 wherein said method additionally comprises the steps of:
receiving information identifying a last playing time for said one of said performances;
calculating additional playing times substantially by adding said repeat factor to prior playing times until one of said additional playing times occurs after said last playing time; and
associating said data record identifying information relative to said each of said additional playing times.

15. A method as claimed in claim 10 wherein said data record receiving step comprises the steps of:
displaying said repeat factor for said one of said performances for user acceptance and modification;
allowing said user to increase said repeat factor for said one of said performances; and
preventing said repeat factor for said one of said performances from being decreased.

16. A method as claimed in claim 10 wherein said entering step comprises the steps of:
including data describing titles for said predetermined performances in said data records;
automatically calculating short titles for said performances, said short titles being formed from characters in corresponding ones of said titles;
displaying said short titles for user acceptance and modification;
allowing said user to modify said short titles; and
including said short titles in said data records.

17. A method of efficiently and accurately managing the exhibition of a first plurality of performances on a second plurality of channels throughout an interval of time, said method comprising the steps of:
entering data identifying said performances and run times therefor into a computer, each of said performances having a unique data record associated therewith;
calculating repeat factors for said performances, said repeat factors being greater than corresponding run times;
storing said repeat factors with corresponding data records;
first receiving information identifying a channel for which exhibitions of one of said performances are to be scheduled;
second receiving information identifying first and last playing times for said one of said performances;
third receiving information identifying said data record for said one of said performances;
first associating said data record identifying information relative to said first playing time;
calculating subsequent playing times substantially by adding said repeat factor to a previous playing time until one of said subsequent playing times is greater than said last playing time; and
subsequent associating said data record identifying information relative to said second playing time;
repeating said first, second, and third receiving steps, said first associating step, said calculating step, and said subsequent associating step for each of said second plurality of channels to produce an exhibition plan; and
controlling a video server to exhibit said performances in accordance with said plan.

18. A method as claimed in claim 17 additionally comprising the step of counting the number of exhibitions for at least one of said predetermined performances within said exhibition plan.

19. A method as claimed in claim 17 wherein said entering step additionally comprises the steps of:
modifying one of said data records;
determining whether said run time for said modified data record has been altered; and
if said run time of said modified data record has been altered, calculating a new repeat factor.

20. A method as claimed in claim 19 wherein said entering step additionally comprises the step of:
determining whether said repeat factor for said modified data record has been altered; and
if said repeat factor of said modified data record has been altered, instructing a user to reschedule exhibitions of the one of said performances that corresponds to said modified data record.

21. A method as claimed in claim 17 wherein said third receiving step comprises the steps of:
displaying said repeat factor for said one of said performances for user acceptance and modification;
allowing said user to increase said repeat factor for said one of said performances; and
preventing said repeat factor for said one of said performances from being decreased.

* * * * *